US012653651B2

(12) United States Patent
Tao et al.

(10) Patent No.: US 12,653,651 B2
(45) Date of Patent: Jun. 16, 2026

(54) ORAL TREATMENT DEVICE

(71) Applicant: Dyson Technology Limited, Wiltshire (GB)

(72) Inventors: Lili Tao, Bristol (GB); Christopher John Bateman, Swindon (GB); Ehsan Nadernejad, Coventry (GB); Miltiadis Alexios Papadopoulos, Bristol (GB)

(73) Assignee: Dyson Technology Limited, Malmesbury (GB)

( * ) Notice: Subject to any disclaimer, the term of this patent is extended or adjusted under 35 U.S.C. 154(b) by 408 days.

(21) Appl. No.: 18/266,704

(22) PCT Filed: Oct. 25, 2021

(86) PCT No.: PCT/GB2021/052761
§ 371 (c)(1),
(2) Date: Jun. 12, 2023

(87) PCT Pub. No.: WO2022/129840
PCT Pub. Date: Jun. 23, 2022

(65) Prior Publication Data
US 2024/0041571 A1 Feb. 8, 2024

(30) Foreign Application Priority Data
Dec. 17, 2020 (GB) ..................................... 2020016

(51) Int. Cl.
*A61C 17/00* (2006.01)
*A46B 15/00* (2006.01)
(Continued)

(52) U.S. Cl.
CPC ........ *A61C 9/0053* (2013.01); *A46B 15/0006* (2013.01); *A61C 15/047* (2013.01); *A46B 2200/108* (2013.01); *A61C 17/00* (2013.01)

(58) Field of Classification Search
CPC ......... A61C 17/36; A61C 17/28; A61C 17/02; G06T 2207/30036
See application file for complete search history.

(56) References Cited

U.S. PATENT DOCUMENTS 6,536,068 B1 3/2003 Yang et al.
6,786,732 B2 9/2004 Savill et al.
(Continued)

FOREIGN PATENT DOCUMENTS

AU 2021399197 B2 1/2025
CN 104921830 A 9/2015
(Continued)

OTHER PUBLICATIONS

Examination Report received for GB Application No. 2020019.2, mailed on Jan. 18, 2023, 2 pages.
(Continued)

*Primary Examiner* — Michael D Jennings
(74) *Attorney, Agent, or Firm* — Tucker Ellis LLP

(57) ABSTRACT

An oral treatment device includes image sensor equipment configured to generate image data indicative of a sequence of images representing at least a portion of an oral cavity of a user. The oral treatment device includes a controller configured to process the image data to determine a movement parameter indicative of movement of the oral treatment device relative to an interproximal gap between adjacent teeth in the oral cavity of the user. The controller is configured to control the oral treatment device to perform an action based on the determined movement parameter.

20 Claims, 7 Drawing Sheets

(51) Int. Cl.
    *A61C 9/00*            (2006.01)
    *A61C 15/04*         (2006.01)

(56)           References Cited

U.S. PATENT DOCUMENTS

| | | | |
|---|---|---|---|
| 8,351,299 | B2 | 1/2013 | Cohen et al. |
| 8,585,411 | B2 | 11/2013 | Puurunen et al. |
| 8,758,022 | B2 | 6/2014 | Kim |
| 8,839,476 | B2 | 9/2014 | Adachi |
| 8,866,894 | B2 | 10/2014 | Wong et al. |
| 9,105,197 | B2 | 8/2015 | Meriheinae et al. |
| 9,204,947 | B2 | 12/2015 | Bovenkamp et al. |
| 9,408,681 | B2 | 8/2016 | Bates et al. |
| 9,445,724 | B2 | 9/2016 | Sumi et al. |
| 9,700,211 | B2 | 7/2017 | Simons et al. |
| 9,861,459 | B2 | 1/2018 | Addington |
| 9,870,613 | B2 | 1/2018 | Wu et al. |
| 10,064,711 | B1 | 9/2018 | Richter et al. |
| 10,098,586 | B2 | 10/2018 | Kusukame et al. |
| 10,172,443 | B2 | 1/2019 | Wang et al. |
| 2002/0183959 | A1 | 12/2002 | Savill et al. |
| 2005/0196725 | A1 | 9/2005 | Fu |
| 2007/0248931 | A1 | 10/2007 | Wong et al. |
| 2008/0102953 | A1 | 5/2008 | Schultz |
| 2009/0092955 | A1 | 4/2009 | Hwang |
| 2010/0170052 | A1 | 7/2010 | Ortins et al. |
| 2010/0309302 | A1 | 12/2010 | Yang |
| 2011/0010875 | A1 | 1/2011 | Iwahori et al. |
| 2011/0085715 | A1 | 4/2011 | Yan et al. |
| 2011/0275424 | A1 | 11/2011 | Schmid et al. |
| 2011/0296643 | A1 | 12/2011 | Shepherd et al. |
| 2012/0310593 | A1 | 12/2012 | Bates et al. |
| 2013/0000670 | A1 | 1/2013 | Binner et al. |
| 2013/0061412 | A1 | 3/2013 | Vashi |
| 2014/0065588 | A1 | 3/2014 | Jacobson et al. |
| 2014/0165311 | A1 | 6/2014 | Donegan |
| 2014/0199651 | A1 | 7/2014 | Adachi |
| 2015/0044629 | A1 | 2/2015 | Wang et al. |
| 2015/0107034 | A1 | 4/2015 | Shani et al. |
| 2015/0113747 | A1 | 4/2015 | May et al. |
| 2015/0157119 | A1 | 6/2015 | Barnes et al. |
| 2016/0022393 | A1 | 1/2016 | Yoshida et al. |
| 2016/0143718 | A1 | 5/2016 | Serval et al. |
| 2016/0235357 | A1 | 8/2016 | Ohmer et al. |
| 2016/0331497 | A1 * | 11/2016 | Follows ............... A61C 17/028 |
| 2016/0331498 | A1 * | 11/2016 | Follows ............... A61C 17/028 |
| 2018/0098620 | A1 | 4/2018 | Lee et al. |
| 2018/0168781 | A1 | 6/2018 | Kopelman et al. |
| 2019/0090999 | A1 | 3/2019 | Vetter et al. |
| 2019/0167400 | A1 | 6/2019 | Barnes et al. |
| 2019/0200746 | A1 | 7/2019 | Serval et al. |
| 2019/0278786 | A1 | 9/2019 | Sherman et al. |
| 2019/0328234 | A1 | 10/2019 | Seibel et al. |
| 2019/0357667 | A1 | 11/2019 | Beckman |
| 2020/0022488 | A1 | 1/2020 | Den Hamer et al. |
| 2020/0146435 | A1 | 5/2020 | Rmaile et al. |
| 2020/0202520 | A1 | 6/2020 | Joyce et al. |
| 2020/0329857 | A1 | 10/2020 | Deane et al. |
| 2021/0235859 | A1 | 8/2021 | Farmah |
| 2022/0192805 | A1 | 6/2022 | Duineveld et al. |

FOREIGN PATENT DOCUMENTS

| | | | |
|---|---|---|---|
| CN | 108066030 | A | 5/2018 |
| CN | 108378949 | A | 8/2018 |
| CN | 108778052 | A | 11/2018 |
| CN | 109152471 | A | 1/2019 |
| CN | 208851681 | U | 5/2019 |
| CN | 110213980 | A | 9/2019 |
| CN | 110265135 | A | 9/2019 |
| CN | 110477594 | A | 11/2019 |
| CN | 110831461 | A | 2/2020 |
| CN | 111918620 | A | 11/2020 |
| CN | 112020340 | A | 12/2020 |
| DE | 102008027317 | B4 | 11/2011 |
| DE | 102011056867 | A1 | 6/2013 |
| DE | 202014005206 | U1 | 7/2014 |
| DE | 102014001163 | A1 | 8/2015 |
| DE | 102014006453 | A1 | 11/2015 |
| DE | 102013016105 | B4 | 3/2020 |
| EP | 2312529 | A2 | 4/2011 |
| EP | 3060160 | B1 | 1/2018 |
| EP | 3363606 | A1 | 8/2018 |
| EP | 3459492 | A1 | 3/2019 |
| EP | 3528171 | A2 | 8/2019 |
| EP | 3725263 | A1 | 10/2020 |
| EP | 3858288 | A1 | 8/2021 |
| GB | 2538302 | A | 11/2016 |
| GB | 2575559 | A | 1/2020 |
| JP | 2012524643 | A | 10/2012 |
| JP | 2019512276 | A | 5/2019 |
| JP | 2020-524550 | A | 8/2020 |
| KR | 10-0815861 | B1 | 3/2008 |
| KR | 10-2008-0053982 | A | 6/2008 |
| KR | 10-2015-0080258 | A | 7/2015 |
| KR | 10-2015-0113647 | A | 10/2015 |
| KR | 10-1560735 | B1 | 10/2015 |
| KR | 10-2016-0028921 | A | 3/2016 |
| KR | 10-1600277 | B1 | 3/2016 |
| KR | 10-2018-0114570 | A | 10/2018 |
| KR | 20200050346 | A | 5/2020 |
| NO | 2018/234129 | A1 | 12/2018 |
| WO | 2007/032015 | A2 | 3/2007 |
| WO | 2016/016323 | A1 | 2/2016 |
| WO | 2016/150515 | A1 | 9/2016 |
| WO | 2018/037318 | A1 | 3/2018 |
| WO | 2018/065374 | A1 | 4/2018 |
| WO | 2018/087627 | A1 | 5/2018 |
| WO | 2019/098466 | A1 | 5/2019 |
| WO | 2019/150515 | A1 | 8/2019 |
| WO | 2019/166386 | A1 | 9/2019 |
| WO | 2019/185497 | A1 | 10/2019 |
| WO | 2019/200746 | A1 | 10/2019 |
| WO | 2019/215318 | A1 | 11/2019 |
| WO | 2019/215447 | A1 | 11/2019 |
| WO | 2019/234129 | A1 | 12/2019 |
| WO | 2020/016545 | A1 | 1/2020 |
| WO | 2020/131471 | A2 | 6/2020 |
| WO | 2020/144692 | A2 | 7/2020 |
| WO | WO-2020212248 | A1 * | 10/2020 | ............. A61C 7/221 |
| WO | 2021/042937 | A1 | 3/2021 |
| WO | 2022/129841 | A1 | 6/2022 |
| WO | 2022/129843 | A1 | 6/2022 |
| WO | 2022/129844 | A1 | 6/2022 |
| WO | 2022/129845 | A1 | 6/2022 |

OTHER PUBLICATIONS

Examination Report received for GB Application No. 2020019.2, mailed on Jun. 20, 2023, 1 page.

Examination Report received for GB Application No. 2020021.8, mailed on Dec. 23, 2022, 2 pages.

International Search Report and Written Opinion received for PCT Patent Application No. PCT/GB2021/052760, mailed on Jan. 26, 2022, 12 pages.

International Search Report and Written Opinion received for PCT Patent Application No. PCT/GB2021/052759, mailed on Jan. 25, 2022, 12 pages.

International Search Report and Written Opinion received for PCT Patent Application No. PCT/GB2021/052761, mailed on Jan. 27, 2022, 12 pages.

International Search Report and Written Opinion received for PCT Patent Application No. PCT/GB2021/052762, mailed on Feb. 2, 2022, 13 pages.

International Search Report and Written Opinion received for PCT Patent Application No. PCT/GB2021/052763, mailed on Jan. 17, 2022, 13 pages.

International Search Report and Written Opinion received for PCT Patent Application No. PCT/GB2021/052764, mailed on Jan. 19, 2022, 14 pages.

International Search Report and Written Opinion received for PCT Patent Application No. PCT/GB2021/052765, mailed on Jan. 21, 2022, 12 pages.

(56) References Cited

OTHER PUBLICATIONS

International Search Report and Written Opinion received for PCT Patent Application No. PCT/GB2021/052766, mailed on Aug. 12, 2021, 13 pages.
Search Report received for GB Application No. 2020015.0, mailed on Apr. 28, 2021, 1 page.
Search Report received for GB Application No. 2020016.8, mailed on Apr. 28, 2021, 1 page.
Search Report received for GB Application No. 2020018.4, mailed on Apr. 28, 2021, 1 page.
Search Report received for GB Application No. 2020019.2, mailed on Apr. 28, 2021 1 page.
Search Report received for GB Application No. 2020021.8, mailed on Apr. 28, 2021, 1 page.
Examination Report received for GB Application No. 2020017.6, mailed on Jan. 18, 2023, 2 pages.
Examination Report received for GB Application No. 2020020.0, mailed on Jan. 18, 2023, 2 pages.
Search Report received for GB Application No. 2020017.6, mailed on Apr. 28, 2021, 1 page.
Search Report received for GB Application No. 2020020.0, mailed on Apr. 28, 2021, 1 page.

* cited by examiner

300

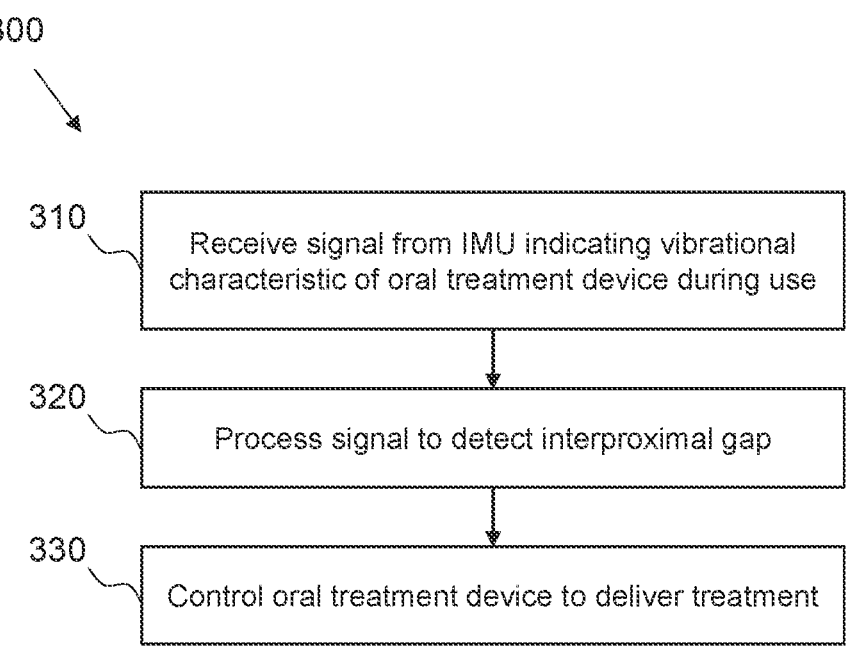

310   Receive signal from IMU indicating vibrational characteristic of oral treatment device during use 320   Process signal to detect interproximal gap 330   Control oral treatment device to deliver treatment

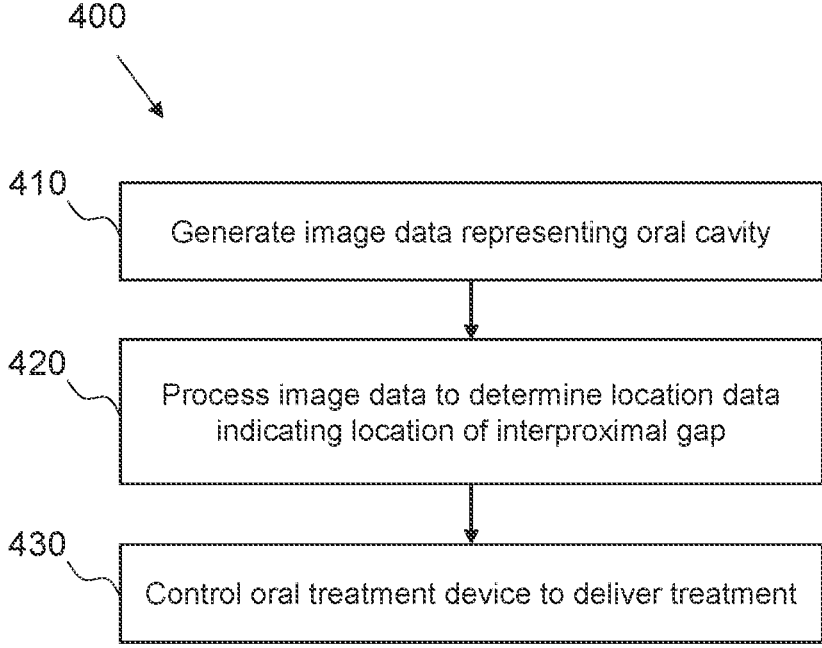

410   Generate image data representing oral cavity

420   Process image data to determine location data indicating location of interproximal gap 430   Control oral treatment device to deliver treatment

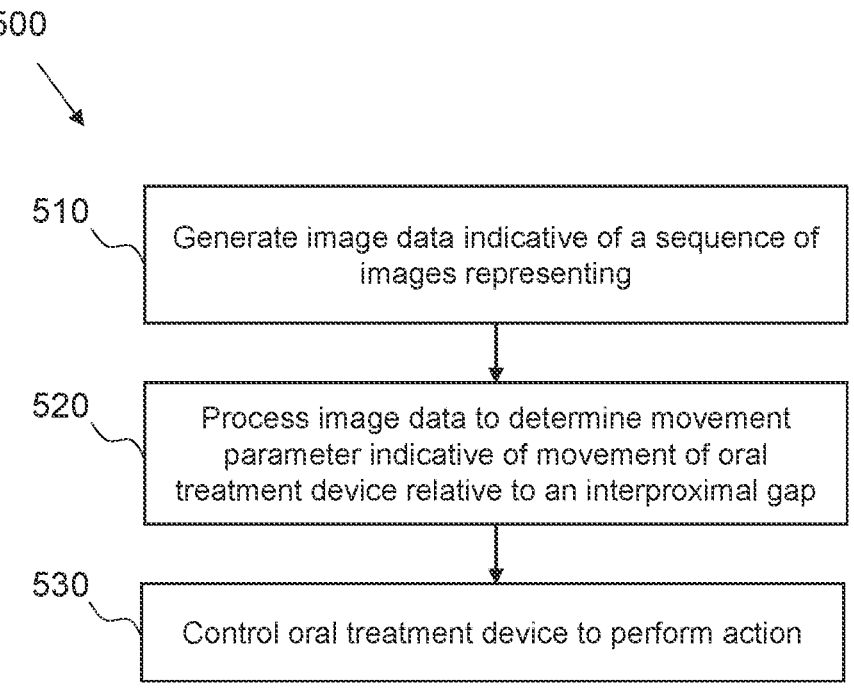

510  Generate image data indicative of a sequence of images representing

520  Process image data to determine movement parameter indicative of movement of oral treatment device relative to an interproximal gap 530  Control oral treatment device to perform action

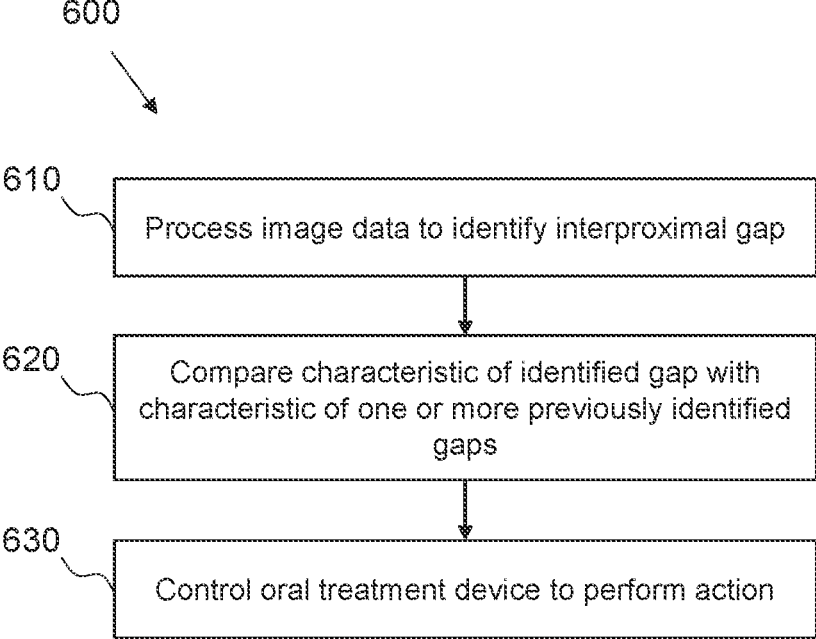

610  Process image data to identify interproximal gap

620  Compare characteristic of identified gap with characteristic of one or more previously identified gaps 630  Control oral treatment device to perform action

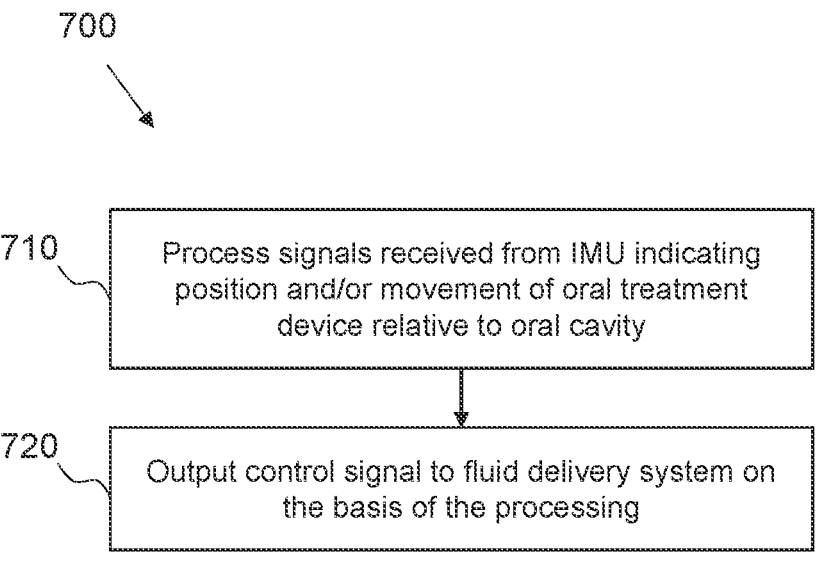

710 — Process signals received from IMU indicating position and/or movement of oral treatment device relative to oral cavity 720 — Output control signal to fluid delivery system on the basis of the processing

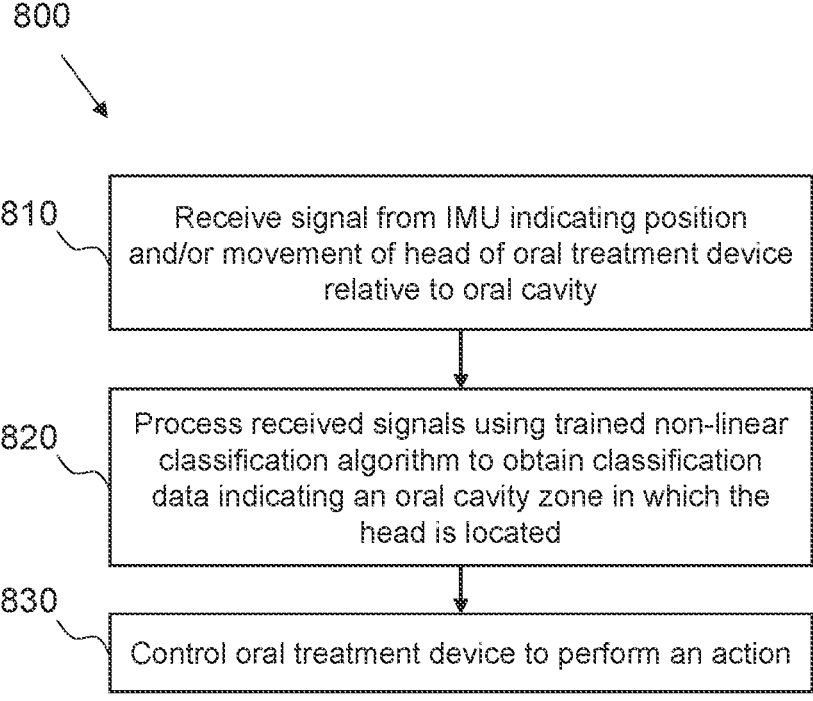

810 — Receive signal from IMU indicating position and/or movement of head of oral treatment device relative to oral cavity 820 — Process received signals using trained non-linear classification algorithm to obtain classification data indicating an oral cavity zone in which the head is located 830 — Control oral treatment device to perform an action

Fig. 8

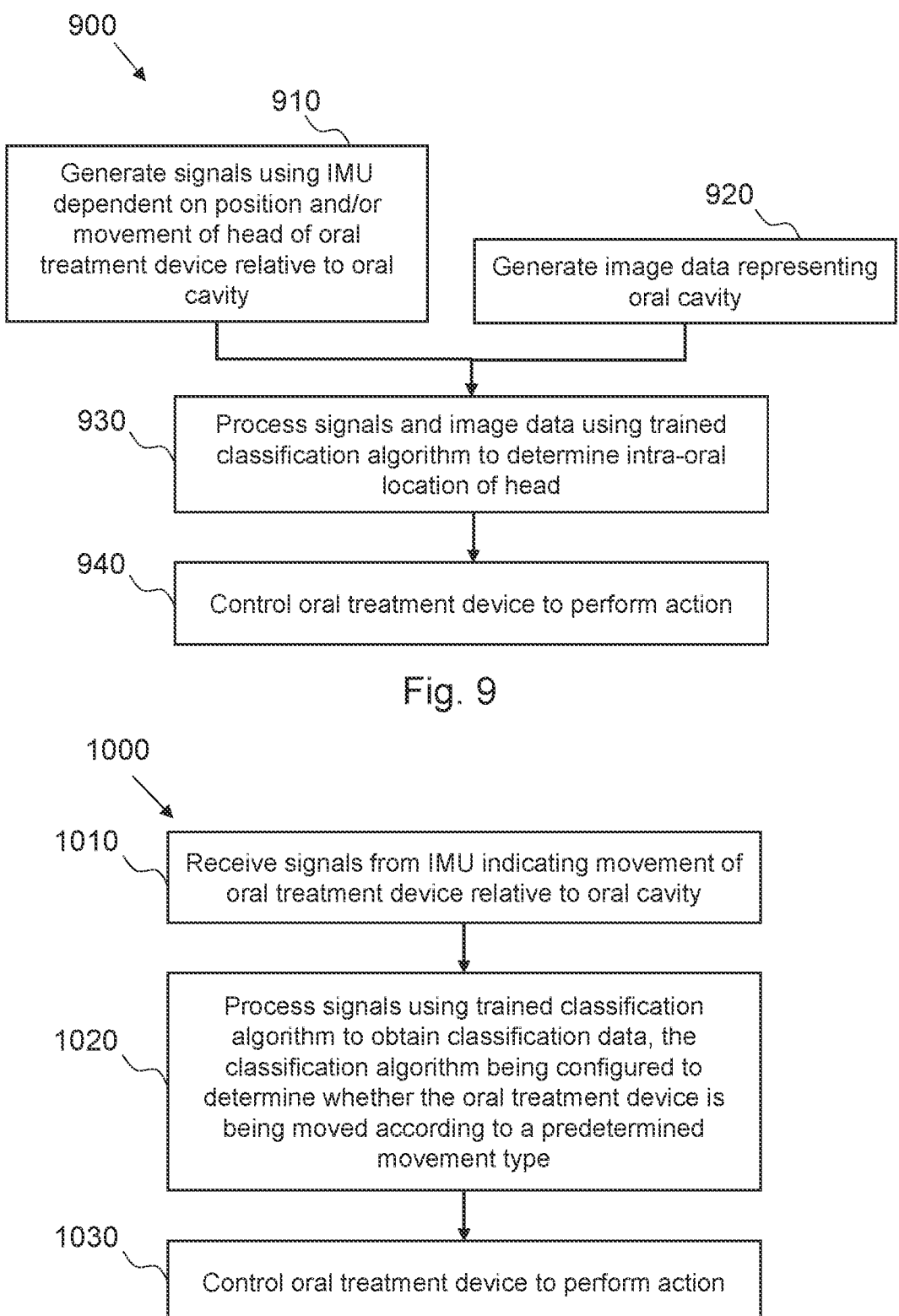

900

910

Generate signals using IMU dependent on position and/or movement of head of oral treatment device relative to oral cavity

920

Generate image data representing oral cavity

930

Process signals and image data using trained classification algorithm to determine intra-oral location of head

940

Control oral treatment device to perform action

Receive signals from IMU indicating movement of oral treatment device relative to oral cavity

1020

Process signals using trained classification algorithm to obtain classification data, the classification algorithm being configured to determine whether the oral treatment device is being moved according to a predetermined movement type

1030

Control oral treatment device to perform action

Fig. 10

ORAL TREATMENT DEVICE

CROSS-REFERENCE TO PRIOR APPLICATION

This application is a § 371 National Stage Application of PCT International Application No. PCT/GB2021/052761 filed Oct. 25, 2021, which claims the priority of United Kingdom Application No. 2020016.8, filed Dec. 17, 2020, each of which are herein incorporated by reference in their entirety.

TECHNICAL FIELD

The present disclosure concerns an oral treatment device. In particular, but not exclusively, the present disclosure concerns measures, including methods, apparatus and computer programs, for operating an oral treatment device.

BACKGROUND

Oral treatment devices are used to provide treatment to the oral cavity (i.e. the mouth) of a user. Examples of such devices include toothbrushes (which may be manual or electric), oral irrigators, interdental cleaning devices, flossing devices, etc.

In some known cases, oral treatment devices (also referred to as "oral care devices", or "oral treatment appliances") can provide a flossing functionality in addition to other functionalities such as tooth brushing. For example, a fluid delivery system may be incorporated into an electric toothbrush, and may be used to deliver a burst of working fluid for interproximal (or interdental) cleaning. Such a fluid delivery system may include a nozzle arranged on the head of the device and used for jetting the working fluid into an interproximal gap between teeth, e.g. to dislodge food matter that is in the gap, and a fluid reservoir for storing the working fluid on the device.

However, the flexibility and/or versatility of known oral treatment devices is limited. This in turn may limit the ability of known devices to deliver treatments in an optimal manner. For example, known oral treatment devices generally rely on a user to use the device correctly, and this may not always occur.

For example, efficient use of working fluid may be a particular consideration where the oral treatment device includes an on-board fluid reservoir having a fixed capacity. Using and/or wasting more working fluid requires a more frequent replenishment of the fluid reservoir. In some cases, effective treatment is not achieved even with repeated attempts.

It is therefore desirable to provide an improved oral treatment device and/or improved methods of operating an oral treatment device.

SUMMARY

According to an aspect of the present disclosure, there is provided an oral treatment device for use in treating an oral cavity of a user, the oral treatment device comprising: image sensor equipment configured to generate image data indicative of a sequence of images representing at least a portion of the oral cavity of the user; and a controller configured to: process the image data to determine a movement parameter indicative of movement of the oral treatment device relative to an interproximal gap between adjacent teeth in the oral cavity of the user; and control the oral treatment device to perform an action based on the determined movement parameter.

Determining a movement parameter indicative of movement of the oral treatment device relative to an interproximal gap enables a finer and/or more intelligent control of the device. In embodiments, the controller is configured to control the oral treatment device to deliver a treatment to the interproximal gap based on the determined movement parameter. That is, the action performed may comprise the delivery of treatment to the gap. By taking into account movement of the device relative to the gap, treatment may be delivered to the gap more accurately and/or effectively. In embodiments, the controller is configured to prevent treatment delivery by the oral treatment device based on the determined movement parameter.

In embodiments, the oral treatment device comprises a fluid delivery system for delivering working fluid to the oral cavity of the user. In some such embodiments, the controller is configured to output a control signal to the fluid delivery system to control delivery of the working fluid based on the determined movement parameter. As such, delivery of the working fluid during use of the device is controlled based on the determined movement of the device (during the same use of the device) relative to the gap. This allows for a more accurate and/or reliable use of the fluid delivery system. In particular, the accuracy of fluid jetting, i.e. the likelihood that working fluid is actually jetted into the interproximal gap, as opposed to elsewhere, is increased. By improving the accuracy and/or reliability of the fluid delivery system, working fluid usage is reduced and more effective treatment achieved more quickly.

As stated above, by taking into account movement of the device relative to the gap, treatment may be delivered to the gap more accurately and/or effectively. For example, there may be a given latency between the time at which an interproximal gap is detected and the time at which working fluid can be delivered to the gap. Such a latency may be due to data processing, signalling between different components and/or devices, operating the fluid delivery system, etc. The delay means that, by the time the fluid delivery system jets the working fluid, the detected gap may no longer be in the path of the jetted fluid. This may be a particular consideration when the footprint of the fluid jet (e.g. the coverage area) is relatively small. By taking movement of the device relative to the gap into account, such movement can be accounted for, thus increasing the accuracy of fluid jetting. For example, the jetting may be delayed until such a time as the gap will be in the path of the working fluid.

In embodiments, the determined movement parameter is indicative of a predicted position of the interproximal gap relative to the oral treatment device at a predetermined future time. The predetermined future time may be the soonest time at which treatment can be delivered. By predicting the position of the gap at such a predetermined future time, the likelihood of a successful (e.g. accurate) treatment being delivered to the gap can be determined. If such a likelihood is determined to be high, e.g. above a predetermined threshold, treatment delivery may proceed. If, however, such a likelihood is determined to be low, e.g. below a predetermined threshold, treatment delivery may be prevented. This enables a more efficient use of the oral treatment device, in that treatment delivery is only triggered when the controller determines, based on the movement parameter, that there is a sufficiently high likelihood of the gap being treated accurately.

In embodiments, the determined movement parameter is indicative of a predicted future time at which the interproximal gap has a predetermined position relative to the oral treatment device. The predetermined position may be a position in the path of a jet of working fluid from a fluid delivery system, for example. As such, the delivery of treatment may be controlled (e.g. delayed) based on the determined movement parameter, to increase the likelihood of successful and accurate treatment of the interproximal gap. This enables a more efficient use of the oral treatment device.

In embodiments, the determined movement parameter is indicative of a velocity and/or acceleration of the oral treatment device relative to the interproximal gap. The determined velocity and/or acceleration can be used to track the trajectory of the gap relative to the device, thereby increasing the accuracy of treatment delivery. It will be understood that one or both of the device and the oral cavity may be moving during use of the device, and so in embodiments it is the relative movement of the device relative to the gap (or vice-versa) that the determined movement parameter indicates.

In embodiments, the controller is configured to process the image data using an optical flow method. The optical flow method can be used to determine the velocity (e.g. in pixels per second) of moving objects between two images in the sequence. Such a moving object need not be the gap itself, but may be another object, e.g. a tooth. Since teeth are rigid objects, image pixels in the gap area may be assumed to have the same displacement between two frames as image pixels in the tooth area. Therefore, movement of the gap relative to the device can be tracked by analysing the pixels of the entire image. This may be particularly advantageous when the gap itself is not present in every image of the sequence, as discussed below. The image data may be processed using methods other than optical flow methods in alternative embodiments.

In embodiments, the oral treatment device comprises a head, and the image sensor equipment is at least partially comprised in the head. Since the head of the device is for delivering a treatment inside the oral cavity of the user, arranging the image sensor equipment at least partially in the head allows for the inside of the oral cavity to be imaged, without requiring a separately mounted camera (i.e. a camera that is mounted separately from the head).

In embodiments, the oral treatment device comprises a handle, and the intraoral image sensor equipment is at least partially comprised in the handle. By arranging the image sensor equipment at least partially in the handle of the device, on-device space may be managed more efficiently. That is, the head of the device may be relatively small compared to the handle, and including the image sensor equipment in the head may require architectural and/or structural changes to the head, which may be relatively complex and/or expensive. Further, in embodiments, the head of the device is separable from the handle and is disposable, and it may be desired for a user to replace the head periodically after use. Arranging the image sensor equipment at least partially in the handle, as opposed to entirely in the head, thus reduces the cost of replacement parts.

In embodiments, the image sensor equipment comprises an intraoral camera. As such, the interior of the oral cavity of the user is imaged during use of the device, and the image data obtained using the intraoral camera is processed during the use of the device to determine the movement parameter.

In embodiments, the controller is configured to process the image data to detect the interproximal gap. As such, the image data is processed firstly to detect the gap, and secondly to track the trajectory of the gap relative to the device. For example, the gap may be detected in a first image of an image sequence, and subsequent images in the image sequence may be used to track the movement of the gap, e.g. as indicated by the movement parameter. In alternative embodiments, the image data is not processed to detect the gap. For example, the gap may be detected and/or identified prior to the use of the oral treatment device by the user, in some cases.

As discussed above, in embodiments, the interproximal gap is not present in at least one of the sequence of images. In such embodiments, the controller is configured to estimate a location of the interproximal gap for the at least one of the sequence of images based on a location of the interproximal gap in at least one other image of the sequence of images. Therefore, the trajectory of the gap can be tracked even when it is not present (i.e. visible) in the images. For example, the gap may be obscured by other objects, e.g. tongue, toothpaste, etc., in some images. In embodiments, a motion estimation method is used to determine the velocity of objects (not necessarily the gap) between images in the sequence. The location of a gap in a first image in which the gap itself is not present can then be estimated based on the calculated velocity, the location of the gap in a second image, and the time between the first and second images. The first and second images may be consecutive or non-consecutive images in the sequence. In embodiments, the sequence of images comprises a sequence of time-ordered images.

In embodiments, the oral treatment device comprises an inertial measurement unit, IMU, configured to output a signal indicating position and/or movement of the oral treatment device relative to the oral cavity of the user. In such embodiments, the controller is configured to determine the movement parameter in dependence on the signal output by the IMU. Using an IMU in combination with image sensor equipment may improve the accuracy of movement parameter determination compared to a case in which an IMU is not used. For example, the IMU may be used to determine the angular motion of the device relative to the gap. Combining such angular information with the information derived from the image data may increase the accuracy of the path tracking process. In alternative embodiments, an IMU is not used to determine the movement parameter, e.g. the image data alone is used to determine the movement parameter.

In embodiments, the oral treatment device comprises a toothbrush.

According to an aspect of the present disclosure, there is provided a method of operating an oral treatment device for use in treating an oral cavity of a user, the oral treatment device comprising image sensor equipment and a controller. The method comprises: generating, using the image sensor equipment, image data indicative of a sequence of images representing at least a portion of the oral cavity of the user; processing, at the controller, the image data to determine a movement parameter indicative of movement of the oral treatment device relative to an interproximal gap between adjacent teeth in the oral cavity of the user; and controlling, at the controller, the oral treatment device to perform an action based on the determined movement parameter.

According to an aspect of the present disclosure, there is provided a computer program comprising a set of instructions which, when executed by a computerised device, cause the computerised device to perform a method of operating an oral treatment device for use in treating an oral cavity of a user, the method comprising: generating, using image sensor equipment, image data indicative of a sequence of images representing at least a portion of the oral cavity of the user; processing the image data to determine a movement parameter indicative of movement of the oral treatment device relative to an interproximal gap between adjacent teeth in the oral cavity of the user; and controlling the oral treatment device to perform an action based on the determined movement parameter.

It will of course be appreciated that features described in relation to one aspect of the present invention may be incorporated into other aspects of the present invention. For example, a method of the invention may incorporate any of the features described with reference to an apparatus of the invention and vice versa.

BRIEF DESCRIPTION OF THE DRAWINGS

Embodiments of the present disclosure will now be described by way of example only with reference to the accompanying drawings, of which:

FIG. 3 is a flow diagram showing a method of operating an oral treatment device according to embodiments;

FIG. 4 is a flow diagram showing a method of operating an oral treatment device according to embodiments;

FIG. 5 is a flow diagram showing a method of operating an oral treatment device according to embodiments;

FIG. 6 is a flow diagram showing a method of operating an oral treatment device according to embodiments;

FIG. 7 is a flow diagram showing a method of operating an oral treatment device according to embodiments;

FIG. 8 is a flow diagram showing a method of operating an oral treatment device according to embodiments;

FIG. 9 is a flow diagram showing a method of operating an oral treatment device according to embodiments; and FIG. 10 is a flow diagram showing a method of operating an oral treatment device according to embodiments.

DETAILED DESCRIPTION

Figures 1A, 1B:
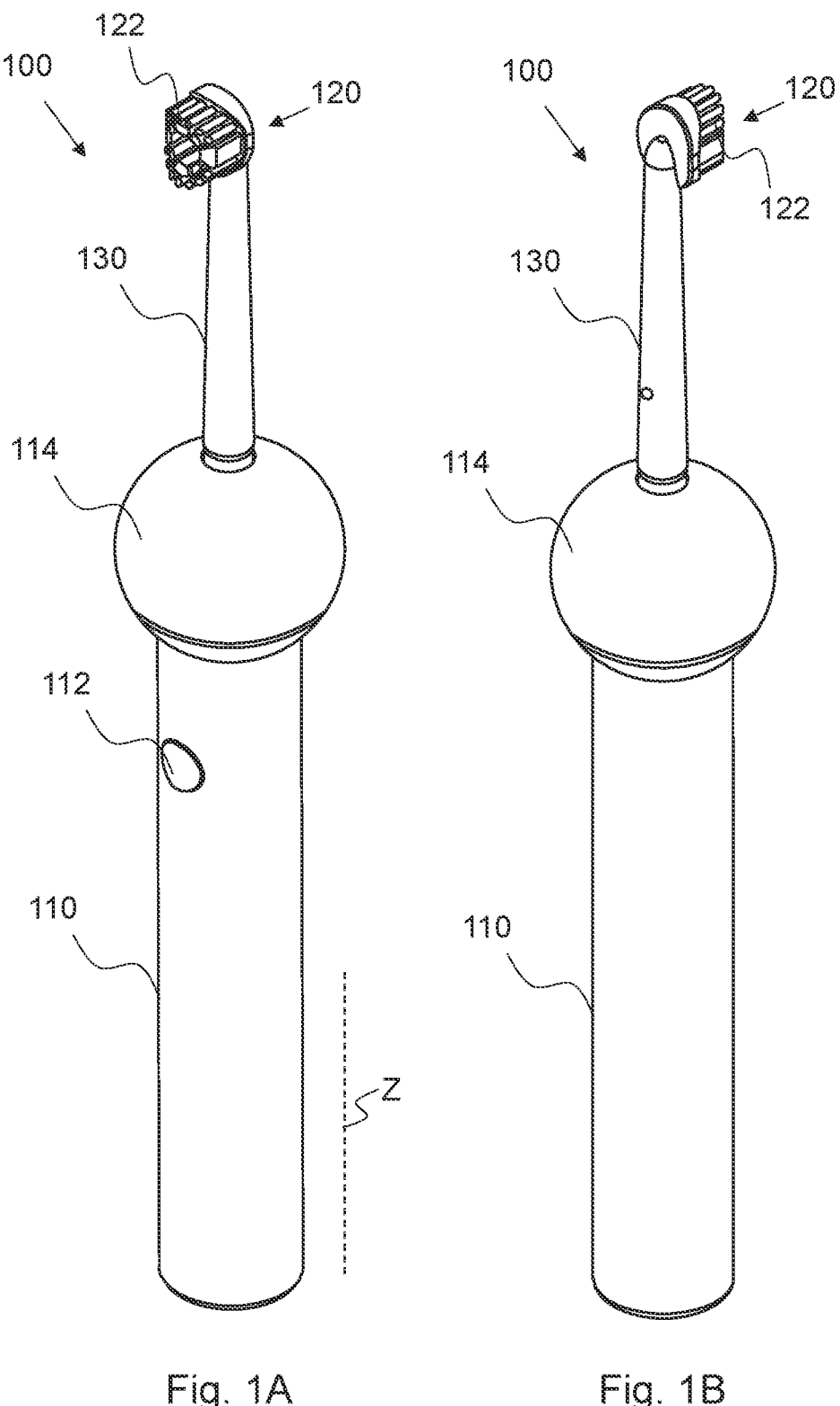
FIGS. 1A and 1B are perspective views of an oral treatment device according to embodiments.
Figure 1C:
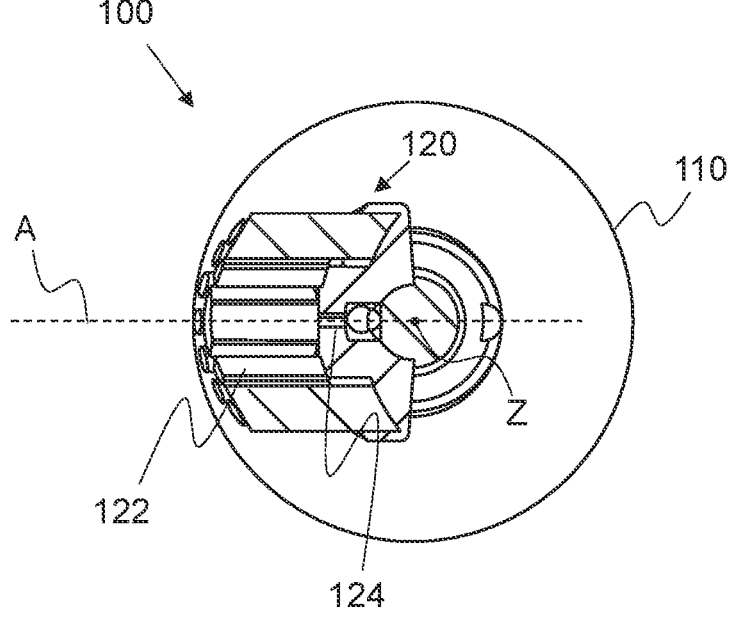
FIG. 1C is a plan view of an oral treatment device according to embodiments.

FIGS. 1A and 1B show perspective views of an oral treatment device 100 according to embodiments. FIG. 1C shows a plan view of the oral treatment device 100. The oral treatment device 100, and/or components thereof, may be used to implement the methods described herein. In the embodiments shown in FIGS. 1A-1C, the oral treatment device 100 comprises a toothbrush. In embodiments, the oral treatment device 100 comprises an electric toothbrush. In embodiments, the device 100 comprises an ultrasonic toothbrush. The oral treatment device 100 may comprise other types of device in alternative embodiments. For example, the device 100 may comprise a flossing device, an oral irrigator, an interproximal cleaning device, an oral care monitoring device, or any combination of such. An oral care monitoring device is configured to monitor the oral health of a user and provide the user with feedback accordingly.

The oral treatment device 100 comprises a handle 110 and a head 120. The handle 110 forms the main body of the device 100, and may be gripped by a user during use of the device 100. In the embodiments shown in FIGS. 1A-1C, the handle 110 comprises a user interface 112. The user interface 112 comprises a user operable button configured to be depressible by the user when the user is holding the handle 110. In some embodiments, the handle 110 comprises a display (not shown), which may be positioned so as to be visible to the user during use of the oral treatment device 100.

In the embodiments shown in FIGS. 1A-1C, the head 120 comprises a plurality of bristles 122 for performing a tooth brushing function. In alternative embodiments, the head 120 does not comprise bristles. For example, in some other embodiments the oral treatment device 100 comprises a dedicated fluid delivery device, e.g. for cleaning gaps between adjacent teeth, and/or for delivering a cleaning or whitening medium to the teeth of the user. In the embodiments shown in FIGS. 1A-1C, the oral treatment device 100 comprises a stem 130 which connects the handle 110 to the head 120. The stem 130 is elongate in shape, which serves to space the head 120 from the handle 110 to facilitate user operability of the oral treatment device 100. The head 120 and/or the stem 130 may be detachable from the handle 110.

The oral treatment device 100 comprises a dental treatment system for delivering a treatment to the oral cavity of the user. In the embodiments shown in FIGS. 1A-1C, the dental treatment system comprises a fluid delivery system, it being understood that other types of dental and/or oral treatment systems may be used in other embodiments. The fluid delivery system is arranged to deliver bursts of working fluid to the oral cavity. In embodiments, the working fluid comprises a liquid, e.g. water. In alternative embodiments, the working fluid comprises a gas and/or a powder. The working fluid may be delivered to an interproximal gap between adjacent teeth to dislodge obstructions, e.g. food matter such as prosciutto or other cured meats, located in the gap. An interproximal gap is a space, or void, between two adjacent teeth, and/or may be an area surrounding a point of contact of adjacent teeth. The interproximal gap may be defined as the area bounded by a plane which is tangential to the lingual side surface of two adjacent teeth, and the region between the teeth.

Additionally or alternatively, the working fluid may be delivered to the gum line of the user, e.g. to treat inflammations or infections of the gums. In alternative embodiments, the dental treatment system is configured to deliver a whitening fluid, and/or to remove plaque from the teeth of the user.

In the embodiments shown in FIGS. 1A-1C, the oral treatment device 100 comprises a fluid reservoir 114 for storing working fluid. The fluid reservoir 114 is arranged in the handle 110 of the oral treatment device 100. The fluid reservoir 114 forms part of the fluid delivery system of the device 100. In embodiments, the fluid reservoir 114 is detachable from the handle 110, e.g. to facilitate replenishment of the working fluid.

In embodiments, the oral treatment device 100 also comprises a nozzle 124. This is shown in FIG. 1C. The nozzle 124 forms part of the fluid delivery system of the device 100. The nozzle 124 is arranged on the head 120 of the device 100. The nozzle 124 is configured to deliver working fluid to the oral cavity of the user during use of the oral treatment device 100. In the embodiments shown in FIGS. 1A-1C, the bristles 122 are arranged at least partially around the nozzle 124. The nozzle 124 extends along a nozzle axis A, illustrated in FIG. 1C. The nozzle axis A is substantially perpendicular to a longitudinal axis Z of the handle 110.

The nozzle 124 is arranged to receive working fluid from the fluid reservoir 114 and to deliver bursts of working fluid to the oral cavity of a user during use of the device 100. In embodiments, the tip of the nozzle 124 comprises a fluid outlet through which a burst of working fluid is delivered to the oral cavity. Each burst of working fluid may have a volume which is less than 1 millilitre, and in some cases less than 0.5 millilitre. The nozzle 124 may also comprise a fluid inlet for receiving working fluid from the fluid reservoir 114.

In embodiments, the fluid delivery system comprises a pump assembly (not shown) for drawing working fluid from the fluid reservoir 114 to the nozzle 124. The pump assembly may be arranged within the handle 110. The pump assembly may comprise a pump (e.g. a positive displacement pump) and a drive for driving the pump. In embodiments, the drive comprises a pump motor. Power may be supplied to the pump motor by a battery (e.g. a rechargeable battery).

In embodiments, the fluid delivery system comprises a control circuit (not shown) for controlling actuation of the pump motor, and hence the control circuit and the pump motor provide a drive for driving the pump. The control circuit may comprise a motor controller which supplies power to the pump motor. The control circuit of the fluid delivery system can receive signals from a controller of the oral treatment device 100, as will be described in more detail below.

Figure 2:
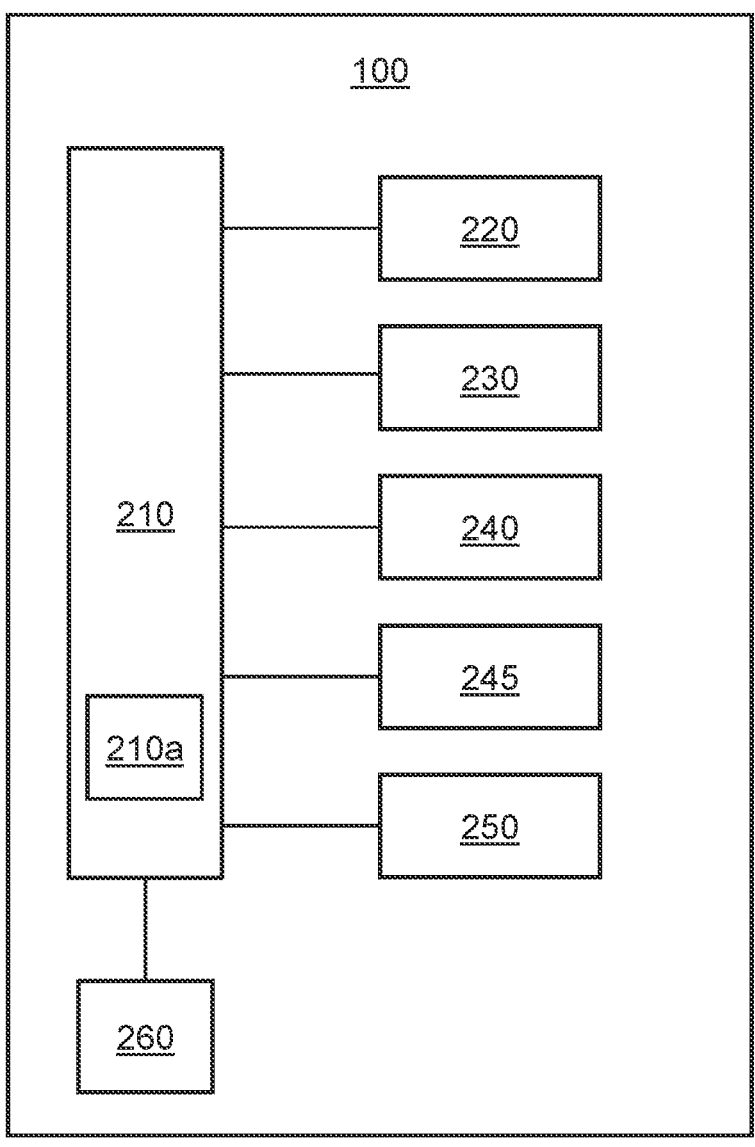
FIG. 2 is a schematic diagram of an oral treatment device according to embodiments.

FIG. 2 shows a schematic block diagram of the oral treatment device 100, according to embodiments.

The oral treatment device 100 comprises a controller 210. The controller 210 is operable to perform various data processing and/or control functions according to embodiments, as will be described in more detail below. The controller 210 may comprise one or more components. The one or more components may be implemented in hardware and/or software. The one or more components may be co-located or may be located remotely from each other in the oral treatment device 100. The controller 210 may be embodied as one or more software functions and/or hardware modules. In embodiments, the controller 210 comprises one or more processors 210a configured to process instructions and/or data. Operations performed by the one or more processors 210a may be carried out by hardware and/or software. The controller 210 may be used to implement the methods described herein. In embodiments, the controller 210 is operable to output control signals for controlling one or more components of the oral treatment device 100.

In embodiments, the oral treatment device 100 comprises a fluid delivery system 220. The fluid delivery system 220 is operable to deliver working fluid to the oral cavity of the user, as described above with reference to FIGS. 1A-1C. In embodiments, the fluid delivery system 200 comprises a nozzle for ejecting working fluid, and a fluid reservoir for storing working fluid in the oral treatment device, such as the nozzle 124 and fluid reservoir 114 described above. The fluid delivery system 220 is operable to receive control signals from the controller 210, thereby allowing the controller 210 to control the delivery of working fluid by the fluid delivery system 220. For example, the controller 210 may output a control signal which is received by a control circuit of the fluid delivery system 220, which causes the control circuit of the fluid delivery system 220 to actuate a pump motor, which in turn causes working fluid to be pumped from the fluid reservoir to the nozzle where it is ejected into the oral cavity of the user. Additionally or alternatively, the controller 210 may output a control signal which is received by a control circuit of the fluid delivery system 220, which causes the control circuit of the fluid delivery system 220 to prevent the working fluid from being delivered via the nozzle. In alternative embodiments, the oral treatment device 100 does not comprise a fluid reservoir. That is, working fluid may be delivered from outside the oral treatment device 100 (e.g. via a dedicated fluid delivery channel) to be ejected via the nozzle, without being stored in the oral treatment device 100.

In embodiments, the oral treatment device 100 comprises image sensor equipment 230. The image sensor equipment 230 comprises one or more image sensors. Examples of such image sensors include, but are not limited to, charge-coupled devices, CCDs, and active-pixel sensors such as complementary metal-oxide-semiconductor, CMOS, sensors. In embodiments, the image sensor equipment comprises intraoral image sensor equipment. For example, the image sensor equipment may comprise an intraoral camera. Intraoral image sensor equipment (e.g. an intraoral camera) is operable to be used at least partially inside the oral cavity of the user, in order to generate image data representing the oral cavity of the user. For example, the image sensor equipment 230 may be at least partially arranged on the head 120 of the oral treatment device 100, which is arranged to be inserted into the oral cavity of the user. In embodiments, the image sensor equipment 230 comprises one or more processors. The controller 210 is operable to receive image data from the image sensor equipment 230. The image data output from the sensor equipment 230 may be used to control the oral treatment device 100. In embodiments, the controller 210 is operable to control the image sensor equipment 230.

In the embodiments shown in FIG. 2, the oral treatment device 100 comprises an inertial measurement unit, IMU 240. In such embodiments, the controller 210 is operable to receive signals from the IMU 240 indicative of position and/or movement of the oral treatment device 100. In embodiments, the IMU 240 comprises an accelerometer, a gyroscope and a magnetometer. Each of the accelerometer, gyroscope and magnetometer has three axes, or degrees of freedom (x, y, z). As such, the IMU 240 may comprise a 9-axis IMU. In alternative embodiments, the IMU 240 comprises an accelerometer and a gyroscope, but does not comprise a magnetometer. In such embodiments, the IMU 240 comprises a 6-axis IMU. A 9-axis IMU may produce more accurate measurements than a 6-axis IMU, due to the additional degrees of freedom. However, a 6-axis IMU may be preferable to a 9-axis IMU in some scenarios. For example, some oral treatment devices may cause and/or encounter magnetic disturbances during use. Heating, magnetism and/or magnetic inductance on the device and/or other magnetic disturbances can affect the behaviour of the magnetometer. As such, in some cases, a 6-axis IMU is more reliable and/or accurate than a 9-axis IMU. The IMU 240 is configured to output data indicating accelerometer and gyroscope signals (and in some embodiments magnetometer signals). In embodiments, the IMU 240 is arranged in the head 120 of the oral treatment device 100. In alternative embodiments, the IMU 240 is arranged in the handle 110 of the oral treatment device 100. In embodiments, the oral treatment device 100 comprises a plurality of IMUs 140. For example, a first IMU 240 may be arranged in the head 120 and a second IMU 240 may be arranged in the handle 110.

In embodiments, the oral treatment device 100 comprises a contact member 245. The contact member 245 is operable to be in contact with teeth of the user during use of the oral treatment device 100, as will be described in more detail below. The contact member 245 is arranged on the head 120 of the oral treatment device 100. For example, the contact member 245 may comprise the nozzle of the fluid delivery system 220, e.g. the nozzle 124 described above with reference to FIGS. 1A-1C.

In embodiments, the oral treatment device 100 comprises a user interface 250. The user interface 250 may be similar to the user interface 112 described above with reference to FIGS. 1A-1C. The user interface 250 may comprise an audio and/or visual interface, for example. In embodiments, the user interface 250 comprises a display (for example a touch-screen display). In embodiments, the user interface 250 comprises an audio output device such as a speaker. In embodiments, the user interface 250 comprises a haptic feedback generator configured to provide haptic feedback to a user. The controller 210 is operable to control the user interface 250, e.g. to cause the user interface 250 to provide output for a user. In some embodiments, the controller 210 is operable to receive data, e.g. based on user input, via the user interface 250. For example, the user interface 250 may comprise one or more buttons and/or a touch sensor.

The oral treatment device 100 also comprises a memory 260. The memory 260 is operable to store various data according to embodiments. The memory may comprise at least one volatile memory, at least one non-volatile memory, and/or at least one data storage unit. The volatile memory, non-volatile memory and/or data storage unit may be configured to store computer-readable information and/or instructions for use/execution by the controller 210.

The oral treatment device 100 may comprise more, fewer and/or different components in alternative embodiments. In particular, at least some of the components of the oral treatment device 100 shown in FIGS. 1A-1C and/or 2 may be omitted (e.g. may not be required) in some embodiments. For example, at least one of the fluid delivery system 220, image sensor equipment 230, IMU 240, user interface 250 and memory 260 may be omitted in some embodiments. In embodiments, the oral treatment device 100 comprises additional components not shown, e.g. a power source such as a battery.

FIG. 3 shows a method 300 of operating an oral treatment device, according to embodiments. The method 300 may be used to operate the oral treatment device 100 described above with reference to FIGS. 1A, 1B and 2. In the embodiments of FIG. 3, the oral treatment device 100 comprises the IMU 240, and the contact member 245 operable to be in contact with teeth of the user during use of the oral treatment device 100. In embodiments, the method 300 is performed at least in part by the controller 210.

In step 310, a signal indicating a vibrational characteristic of the oral treatment device 100 during use of the oral treatment device 100 is received from the IMU 240. The vibrational characteristic is dependent on contact between the contact member 245 and the teeth. As such, the vibrational characteristic may be different (or may have different values) depending on whether or not the contact member 245 is in contact with the teeth.

In step 320, the signal is processed to detect an interproximal gap between adjacent teeth in the oral cavity of the user.

In step 330, during the use of the oral treatment device, the oral treatment device is controlled to deliver a treatment to the detected interproximal gap.

Therefore, during use of the device 100 by the user, an interproximal gap can be detected automatically, through use of the contact member 245 and IMU 240, and treatment delivery can be controlled accordingly. As such, the user does not need to determine when the device 100 is in a position that is suitable for treatment delivery, e.g. proximate to or in an interproximal gap. Instead, such a determination is made automatically by monitoring the vibrational characteristic of the device 100, which changes depending on contact between the contact member 245 and the teeth. By automatically detecting the interproximal gap and/or the position of the device 100 relative to the interproximal gap during use, and using such information to control treatment delivery at that time (i.e. during the same use of the device 100), treatment delivery is made more accurate.

A vibrational characteristic is a characteristic of vibrations of the device 100 during use of the device 100. For example, the vibrational characteristic may relate to a frequency and/or an amplitude of vibrations. When the contact member 245 is in contact with a tooth, the vibrations of the device 100 are more dampened, due to the contact, compared to when the contact member 245 is not in contact with a tooth, e.g. when the contact member 245 is in, or at, an interproximal gap between adjacent teeth. By analysing the IMU signals to determine how the vibrations of the device 100 are being dampened, it can be inferred whether or not the contact member 245 is currently in, or at, an interproximal gap.

In embodiments, for example where the head 120 of the oral treatment device 100 comprises a plurality of bristles 122, the contact member 245 is separate from the plurality of bristles 122. As such, both the bristles 122 and, separately, the contact member 245 may be in contact with the teeth of the user during use of the device 100. The contact member 245 may comprise a member that has a higher rigidity than the bristles 122, for example. By using a separate contact member 245, the properties of the contact member 245 may be chosen and/or tuned such that interproximal gap detection is optimised. For example, it may be desirable to use a contact member 245 having a relatively high rigidity, e.g. a rigidity above a predetermined threshold, in order to produce a readily detectable change in the measured vibrational characteristic when the contact member 245 moves into or out of the interproximal gap. The bristles themselves may, in some embodiments, be insufficiently rigid to produce such a readily detectable change, and increasing the rigidity of the bristles to achieve such an effect may impede the brushing functionality of the bristles.

In embodiments, for example where the oral treatment device comprises the fluid delivery system 220 comprising a nozzle via which the working fluid is deliverable to the oral cavity of the user, the contact member comprises the nozzle, e.g. the nozzle 124 described above with reference to FIGS. 1A-1C. Therefore, the nozzle may function as both a means via which working fluid can be jetted towards an interproximal gap, and as a contact member used in automatic detection of the interproximal gap (and thereby trigger the jetting).

In embodiments, the IMU 240 is comprised in the handle 110 of the device 100. By arranging the IMU 240 in the handle 110 of the device 100, instead of in the head 120 of the device 100, on-device space may be managed more efficiently. That is, the head 120 of the device 100 may be relatively small compared to the handle 110, and including an IMU in the head 120 may require an undesirable architectural and/or structural change to the head 120 in order to accommodate the IMU 240. Further, in embodiments, the head 120 of the device 100 is separable from the handle 110 and is disposable, and it may be desired for a user to replace the head periodically after use. Arranging the IMU 240 in the handle 110 instead of the head 120 thus reduces the cost of replacement parts.

In embodiments, the IMU 240 is comprised in the head 120 of the device 100. Arranging the IMU 240 in the head 120 of the device 100 may produce a more readily detectable signal (and thus more accurate and/or reliable gap detection) compared to a case in which the IMU 240 is arranged in the handle 110, since the IMU 240 is arranged in closer proximity to the contact member 245.

In embodiments, for example where the oral treatment device 100 comprises the fluid delivery system 220, a control signal is outputted to the fluid delivery system 220 to control delivery of the working fluid in response to detecting the interproximal gap. As such, delivery of the working fluid during use of the device 100 is controlled in response to the automatic detection of the interproximal gap (during the same use of the device 100) achieved using the contact member 245 and IMU 240. This allows for a more accurate and/or reliable use of the fluid delivery system 220. By improving the accuracy and/or reliability of the fluid delivery system 220, working fluid usage is reduced and more effective treatment achieved more quickly. In embodiments, the control signal is outputted to the fluid delivery system 220 to cause the fluid delivery system to deliver the working fluid to the interproximal gap. As such, the jetting of the working fluid can be triggered directly in response to the interproximal gap detection performed through use of the IMU 240 and contact member 245. This improves the accuracy of fluid jetting, e.g. the likelihood that working fluid is actually jetted into the interproximal gap, as opposed to elsewhere, is increased.

In embodiments, the vibrational characteristic is indicative of ultrasonic vibrations generated by the oral treatment device 100. The ultrasonic vibrations may be generated as part of a tooth brushing and/or plaque removal functionality of the device 100. In other examples, the vibrational characteristic is indicative of sonic vibrations generated by the device 100, e.g. by a motor configured to drive movement of the head 120 of the device 100 relative to the handle 110 of the device 100. As such, the existing functionality of the device 100 is exploited to provide automated interproximal gap detection, and a separate vibration-generating means is not required.

In embodiments, the received signal is processed to detect a change in the vibrational characteristic of the oral treatment device 100. A determination is made, based on the detected change, that the contact member 245 has moved into or out of the interproximal gap. The device 100 is controlled to perform the action based on the determining.

In embodiments, the received signal comprises accelerometer data. In embodiments, the vibrational characteristic comprises one or more of: an amplitude and a frequency of vibrations of the oral treatment device. In embodiments, the received signal is processed using one or more frequency filters to obtain a filtered signal. In embodiments, the one or more frequency filters comprise a low pass frequency filter. Such a low pass frequency filter is useable to reduce noise from the received IMU signals. Such noise may, for example, be due to the vibration of the device, imperfections in IMU manufacture (e.g. variation between different IMUs), etc. Reducing noise using one or more frequency filters increases the reliability and/or accuracy of gap detection, e.g. by improving a signal to noise ratio. In embodiments, a moving average is applied to the received IMU signals, such that signals corresponding to repeated and/or regular rapid movements (e.g. corresponding to a "scrubbing motion" of the device) may be removed, thereby enabling interproximal gap detection to be performed even when the device is being moved rapidly back and forth. In embodiments, one or more amplitude thresholds are applied to the filtered signal to detect the interproximal gap. Such filters and/or thresholds are chosen so as to increase the reliability and/or accuracy of gap detection, e.g. by improving a signal to noise ratio compared to the "raw" signals received from the IMU 240. The filters and/or thresholds may be predetermined, and/or may be modified or calculated during use of the device 100 in order to improve the accuracy of gap detection.

FIG. 4 shows a method 400 of operating an oral treatment device, according to embodiments. The method 400 may be used to operate the oral treatment device 100 described above with reference to FIGS. 1A, 1B and 2. In the embodiments of FIG. 4, the oral treatment device 100 comprises the image sensor equipment 230. In these embodiments, the image sensor equipment 230 comprises intraoral image sensor equipment. In embodiments, the method 400 is performed at least in part by the controller 210.

In step 410, the intraoral image sensor equipment 230 generates image data representing at least a portion of the oral cavity of the user during use by the user of the oral treatment device 100.

In embodiments, the intraoral image sensor equipment 230 is at least partially comprised in the head 120 of the oral treatment device 100. Since the head 120 of the device 100 is for delivering a treatment inside the oral cavity of the user, arranging the intraoral image sensor equipment 230 at least partially in the head 120 allows for the interior of the oral cavity to be imaged, without requiring a separately mounted intraoral camera (i.e. a camera that is mounted separately from the head 120).

In embodiments, the intraoral image sensor equipment 230 is at least partially comprised in the handle 110 of the oral treatment device 100. As such, the image sensor equipment 230 may still be referred to as "intraoral image sensor equipment", even if a part of the image sensor equipment 230, e.g. an image sensor, is arranged to remain outside the oral cavity of the user. By arranging the image sensor equipment 230 at least partially in the handle 110 of the device 100, on-device space may be managed more efficiently. That is, the head 120 of the device 100 may be relatively small compared to the handle 110, and including the image sensor equipment 230 in the head 120 may require architectural and/or structural changes to the head 120, which may be relatively complex and/or expensive. Further, in embodiments, the head 120 of the device 100 is separable from the handle and is disposable, and it may be desired for a user to replace the head 120 periodically after use. Arranging the image sensor equipment 230 at least partially in the handle 110, as opposed to entirely in the head 120, thus reduces the cost of replacement parts.

In embodiments, the intraoral image sensor equipment 230 comprises a sensor and an aperture for receiving light and delivering the light to the sensor. The aperture is comprised in the head 120 of the oral treatment device 100. For example, where the head 120 of the device 100 comprises a set of bristles 122, e.g. to perform a tooth brushing function, the aperture may be arranged behind the bristles 122 such that the bristles 122 do not obscure (i.e. block light from) the aperture. In embodiments, the image sensor equipment 230 comprises a guide channel for guiding light from the aperture to the image sensor. For example, where the oral treatment device 100 comprises a head 120, a handle 110, and a stem 130 connecting the head 120 and the handle 110, the guide channel may extend from the aperture to the sensor, along (e.g. within) the stem 130. The guide channel may comprise a fibre optic cable, for example. In alternative embodiments, the stem 130 is hollow and is arranged to sheathe the image sensor, which is arranged behind the head 120 of the device 100. This reduces the distance between the aperture and the sensor whilst ensuring that the sensor is not comprised in the (disposable) head 120.

In embodiments, the image data comprises red, green and blue, RGB, image data. Other types of image data (e.g. black and white image data) may be used in alternative embodiments.

In step 420, the generated image data is processed to determine location data indicating a location of an interproximal gap between adjacent teeth in the oral cavity of the user. The generated image data is processed using a trained classification algorithm configured to identify interproximal gaps. The trained classification algorithm is trained prior to the use of the oral treatment device.

In step 430, during the use of the oral treatment device 100, the oral treatment device 100 is controlled to deliver a treatment to the detected interproximal gap.

Therefore, during use of the device 100 by the user, an interproximal gap can be detected automatically, through use of the intraoral image sensor equipment 230 and trained classification algorithm, and treatment delivery can be controlled accordingly, without the need for user input. For example, the user does not need to determine when the device 100 is in a position that is suitable for treatment delivery, e.g. proximate to or in an interproximal gap. Instead, such a determination is made automatically based on the intraoral image data, and can be performed in substantially real-time. Processing intraoral image data using the trained classification algorithm increases the accuracy and/or reliability of interproximal gap detection and/or localisation compared to a case in which intraoral image data is not processed using such a trained algorithm. By more accurately detecting the interproximal gap and/or the position of the device 100 relative to the interproximal gap during use, and using such information to control treatment delivery at that time (i.e. during the same use of the device), treatment delivery is made more accurate. Further, the use of image data allows the gap to not only be detected, but also localised. Localising the gap allows for a more accurate and/or reliable delivery of treatment compared to a case in which the gap is not localised.

In embodiments where the oral treatment device 100 comprises the fluid delivery system 220 for delivering working fluid to the oral cavity of the user, a control signal is outputted to the fluid delivery system 220 to control delivery of the working fluid based on the location data. As such, delivery of the working fluid during use of the device 100 is controlled in response to the automatic localisation of the interproximal gap (during the same use of the device 100) achieved using the intraoral camera 250 and trained classification algorithm. This allows for a more accurate and/or reliable use of the fluid delivery system 220. In particular, the accuracy of fluid jetting, i.e. the likelihood that working fluid is actually jetted into the interproximal gap, as opposed to elsewhere, is increased. By improving the accuracy and/or reliability of the fluid delivery system 220, working fluid usage is reduced and treatment achieved more quickly.

In embodiments, the generated image data is processed using a sliding window. In such embodiments, the location data is determined by detecting the presence of the interproximal gap within the sliding window. In other words, the sliding window passes across the image, defining sub-regions of the image, and a determination is made on whether a gap exists in each sub-region of the image. This is described in more detail below.

In embodiments, the generated image data is processed by extracting one or more image features from the image data, and using the extracted one or more image features to determine the location data. The image features may comprise texture-based image features, for example. Since an image consists of pixels which are highly related to each other, image feature extraction is used to obtain the most representative and informative (i.e. non-redundant) information of an image, in order to reduce dimensionality and/or facilitate learning of the classification algorithm.

In embodiments, the one or more image features are extracted using a discrete wavelet transform. The discrete wavelet transform can capture both frequency and location information in an image. The image frequency in gap areas is typically higher than the image frequency in teeth or gum areas. This allows a discrete wavelet transform to produce a frequency map of the image that is usable to detect interproximal gaps. In embodiments, a Haar wavelet is used, which has a relatively low computational complexity and low memory usage compared to other wavelets. The coefficients of the wavelet transform (or approximations thereof) may be used as the extracted image features. For example, the output of feature extraction based on the Haar wavelet applied to an image of size axa may include a horizontal wave h (a/4×a/4), a vertical wave v (a/4×a/4) and a diagonal wave d (a/4×a/4). Other wavelets can be used in alternative embodiments.

The extracted features may be used for a sliding window applied to the image. For example, in the image sub-region defined by the sliding window, a 2×2 pooling for each of h, v and d may be performed, before h, v and d are vectorised and combined into one vector with size 1×108. This may be normalised, along with trained data from the trained classification algorithm, e.g. trained mean and variance values. A support-vector machine, SVM, may be used as a non-probabilistic non-linear binary classifier with a Gaussian radial basis function kernel, which receives the normalised data from the previous step. The trained SVM comprises support vectors having trained coefficients and biases, i.e. determined during a previous training phase. For example, given a set of images together with ground truth labelling, the classification algorithm can be trained so as to assign new examples to one category (e.g. gap) or another (e.g. non-gap).

In embodiments, the one or more image features are extracted using at least one of: an edge detector, a corner detector, and a blob extractor. Extracting image features using such methods may provide a more accurate detection and/or localisation of interproximal gaps compared to other methods.

In embodiments, for example where the oral treatment device 100 comprises a user interface, the user interface is caused to provide an output dependent on the location data. For example, the output may comprise a notification notifying the user that an interproximal gap has been located, indicating the location of the interproximal gap, informing the user that treatment delivery has been performed on the interproximal gap, and/or instructing the user to adjust the position and/or orientation of the device such that more accurate treatment delivery (e.g. jetting of working fluid) can be performed. The output provided may comprise a visual, audio and/or haptic output, for example.

In embodiments, for example where the oral treatment device 100 comprises the memory 260, one or more characteristics of the interproximal gap are stored in the memory 260 for use in subsequent processing and/or control of the oral treatment device 100. For example, the one or more stored characteristics may be used to compare the interproximal gap with subsequently identified interproximal gaps. In other cases, the one or more stored characteristics are used to track the interproximal gap over time.

FIG. 5 shows a method 500 of operating an oral treatment device, according to embodiments. The method 500 may be used to operate the oral treatment device 100 described above with reference to FIGS. 1A, 1B and 2. In the embodiments of FIG. 5, the oral treatment device 100 comprises the image sensor equipment 240. In embodiments, the method 500 is performed at least in part by the controller 210.

In step 510, image data is generated by the image sensor equipment 240. The image data is indicative of a sequence of images representing at least a portion of the oral cavity of the user. As such, images of the portion of the oral cavity may be captured at a plurality of different times.

In step 520, the image data is processed to determine a movement parameter. The movement parameter is indicative of movement of the oral treatment device 100 relative to an interproximal gap between adjacent teeth in the oral cavity of the user.

In step 530, the oral treatment device 100 is controlled to perform an action based on the determined movement parameter.

By determining a movement parameter indicative of movement of the oral treatment device relative to an interproximal gap, a finer and/or more intelligent control of the device 100 is enabled. In particular, by taking into account movement of the device 100 relative to the gap (or vice-versa), treatment may be delivered to the gap more accurately and/or effectively.

In embodiments, the oral treatment device is controlled to deliver a treatment to the interproximal gap based on the determined movement parameter. As such, the action performed at step 530 may comprise the delivery of the treatment to the interproximal gap.

In embodiments, treatment delivery by the oral treatment device 100 is prevented based on the determined movement parameter. As such, the action performed at step 530 may comprise prevention of treatment delivery to the interproximal gap.

In embodiments, the determined movement parameter is indicative of a predicted position of the interproximal gap relative to the oral treatment device 100 at a predetermined future time. The predetermined future time may be the soonest time at which treatment delivery can be actuated. By predicting the position of the gap at such a predetermined future time, the likelihood of a successful (e.g. accurate) treatment being delivered to the gap can be determined. If such a likelihood is determined to be high, e.g. above a predetermined threshold, treatment delivery may be permitted. If, however, such a likelihood is determined to be low, e.g. below a predetermined threshold, treatment delivery may be prevented. This enables a more efficient use of the device 100, in that treatment delivery is only triggered when it is determined, based on the movement parameter, that there is a sufficiently high likelihood of the gap being treated accurately and/or effectively.

In embodiments, the determined movement parameter is indicative of a predicted future time at which the interproximal gap has a predetermined position relative to the oral treatment device 100. The predetermined position may be a position in the path of a jet of working fluid from a fluid delivery system, for example. As such, the delivery of treatment may be controlled (e.g. delayed) based on the determined movement parameter, to increase the likelihood of successful and accurate treatment of the interproximal gap. This enables a more efficient use of the oral treatment device 100.

In embodiments, the determined movement parameter is indicative of a velocity and/or acceleration of the oral treatment device 100 relative to the interproximal gap. The determined velocity and/or acceleration can be used to track the trajectory of the gap relative to the device 100, thereby increasing the accuracy of treatment delivery.

In embodiments where the oral treatment device 100 comprises the fluid delivery system 220 for delivering working fluid to the oral cavity of the user, a control signal is outputted to the fluid delivery system 220 to control delivery of the working fluid based on the determined movement parameter. Hence, the action performed at item 530 may comprise the control of the fluid delivery system 220. As such, delivery of the working fluid during use of the device is controlled based on the determined movement of the device (during the same use of the device) relative to the gap. This allows for a more accurate and/or reliable use of the fluid delivery system. In particular, the accuracy of fluid jetting, i.e. the likelihood that working fluid is actually jetted into the interproximal gap, as opposed to elsewhere, is increased. For example, there may be a given latency between the time at which an interproximal gap is detected and the time at which working fluid can be delivered to the gap. Such a latency may be due to data processing, signalling between different components and/or devices, operating the fluid delivery system 220, etc. The delay means that, by the time the fluid delivery system jets the working fluid, the detected gap may no longer be in the path of the jetted fluid. However, by taking movement of the device 100 relative to the gap into account, such movement can be corrected for, thus increasing the accuracy of fluid jetting. For example, the jetting may be delayed until such a time as the gap will be in the path of the working fluid. By improving the accuracy and/or reliability of the fluid delivery system 220, working fluid usage is reduced and more effective treatment achieved more quickly.

In embodiments, the image sensor equipment 230 is at least partially comprised in the head 120 of the oral treatment device 100. Since the head 120 of the device 100 is for delivering a treatment inside the oral cavity of the user, arranging the image sensor equipment 230 at least partially in the head 120 allows for the inside of the oral cavity to be imaged, without requiring a separately mounted camera (i.e. a camera that is mounted separately from the head 120).

In embodiments, the image sensor equipment 230 is at least partially comprised in the handle 110 of the oral treatment device 100. By arranging the image sensor equipment 230 at least partially in the handle 110 of the device 100, on-device space may be managed more efficiently, and the cost of replacement parts (i.e. the head 120) reduced, as discussed above.

In embodiments, the image sensor equipment 230 comprises an intraoral camera. An intraoral camera is operable to capture digital images from inside a user's mouth. Such images are then processed to track the movement of the device relative to an interproximal gap, or vice-versa. As such, the interior of the oral cavity of the user is imaged during use of the device 100. The intraoral camera is operable to generate video data, in some cases.

In embodiments, the image data is processed to detect the interproximal gap. As such, the image data is processed firstly to detect the gap, and secondly to dynamically track the trajectory of the gap relative to the device 100. For example, the gap may be detected in a first image of an image sequence, and subsequent images in the image sequence may be used to track the movement of the gap, e.g. as indicated by the movement parameter.

In embodiments, an interproximal gap is tracked between frames by comparing the movement and/or displacement of image pixels between frames. For example, the pixels of a first frame in a sequence, I(x, y, t), are compared with the pixels of a second frame in the sequence, I(x+dx, y+dy, t+dt), to determine movement between frames, i.e. that pixels move by (dx, dy) over time dt. The location of a gap can be predicted based on the displacement calculated from the first and second frames (i.e. the current frame and previous consecutive frame(s)). Since teeth are rigid objects, the pixels in the gap area have a similar displacement between two frames as the pixels in the tooth area. Therefore, the gap can be tracked even when the gap itself is not present in one or more of the images. An optical flow method is used to estimate the velocity (in pixels/second) of a gap relative to the device 100, and the location of the gap at a predetermined future time can be predicted based on the velocity and the known time between frames.

In embodiments, the interproximal gap is not present in at least one of the sequence of images. In such embodiments, a location of the interproximal gap is estimated for the at least one of the sequence of images based on a location of the interproximal gap in at least one other image of the sequence of images. Therefore, the trajectory of the gap can be tracked even when it is not present (i.e. visible) in the images. For example, the gap may be obscured by other objects in some images. In embodiments, an optical flow method is used to determine the velocity of pixels and/or objects between images in the sequence. The location of a gap in a first image in which the gap itself is not present can then be estimated based on the calculated velocity, the location of the gap in a second image, and the time between the first and second images.

In embodiments, the movement parameter is determined in dependence on a signal output by an IMU. For example, where the oral treatment device 100 comprises the IMU 240, the IMU 240 may be configured to output a signal indicating position and/or movement of the oral treatment device 100 relative to the oral cavity of the user. For example, the IMU 240 may be used to determine the angular motion of the device 100 relative to the gap. Such a signal may be used, in combination with the image data, in the determination of the movement parameter.

FIG. 6 shows a method 600 of operating an oral treatment device, according to embodiments. The method 600 may be used to operate the oral treatment device 100 described above with reference to FIGS. 1A, 1B and 2. In the embodiments of FIG. 6, the oral treatment device 100 comprises the image sensor equipment 230. The image sensor equipment 230 is operable to generate image data representing at least a portion of the oral cavity of the user. In embodiments, the method 600 is performed at least in part by the controller 210.

In step 610, the generated image data is processed to identify an interproximal gap between adjacent teeth in the oral cavity of the user.

In step 620, at least one characteristic of the identified interproximal gap is compared with at least one characteristic of one or more previously identified interproximal gaps of the oral cavity of the user. In embodiments, the at least one characteristic of the identified gap comprises a feature that is predicted to vary between different gaps, and/or that is specific to the identified gap. As such, the at least one characteristic can be used to distinguish between gaps. The at least one characteristic may comprise a visual characteristic. In embodiments, the at least one characteristic of the identified interproximal gap is indicative of at least one of: a shape of the identified interproximal gap, an appearance of the identified interproximal gap, a position of the identified interproximal gap, or any distinctive feature of the identified interproximal gap. In embodiments, the at least one characteristic of the identified gap is indicative of a frequency characteristic, e.g. based on a wavelet transform applied to an image of the identified gap.

In step 630, the oral treatment device 100 is controlled to perform an action based on a result of the comparison.

By comparing a characteristic of the identified interproximal gap with a characteristic of one or more previously identified interproximal gaps of the user, the device 100 is controlled in a more intelligent and/or flexible manner. In particular, a determination can be made as to whether the identified gap has been previously identified during the current oral treatment session (i.e. during the use of the device 100 by the user). Such a determination may be performed in substantially real-time, allowing for a prompt and responsive control of the device 100. Previously identified gaps can therefore be re-identified, even if the imaging conditions have changed since the previous identification.

In embodiments, newly identified gaps are handled in a different manner compared to previously identified gaps. That is, the device 100 may be controlled in a first manner if the identified gap is determined to be a newly identified gap, and may be controlled in a second, different manner if the identified gap is determined to be (or be similar to) a previously identified gap. Depending on how the user operates the device 100, a given gap may be encountered once or multiple times during an oral treatment session. By handling newly identified gaps differently to previously identified gaps, the device 100 is thus able to adapt to the user's behaviour.

In embodiments, a similarity metric is calculated in dependence on a result of the comparison. The similarity metric indicates a level of similarity between the identified interproximal gap and the one or more previously identified interproximal gaps. In such embodiments, the oral treatment device 100 is controlled based on the determined similarity metric. The similarity metric may indicate whether the identified gap is the same as or different from the one or more previously identified gaps. That is, the similarity metric may indicate whether the identified gap is a newly identified gap or a previously identified gap. A gap may be "newly identified" if it is determined that the gap has not been previously encountered during the current oral treatment session. That is, the gap may have been identified in a previous oral treatment session, but may still be designated as a newly identified gap if it has not been previously encountered in the current session. In embodiments, the similarity metric is compared with a threshold. If the similarity metric is below the threshold, the gap is designated as a newly identified gap. If the similarity metric is above the threshold, the gap is designated as a previously identified gap.

In embodiments, in response to the similarity metric indicating that the identified interproximal gap is different from the one or more previously identified interproximal gaps, the device 100 is controlled to deliver a treatment to the identified interproximal gap. Therefore, the action performed at item 630 may comprise the delivery of treatment to the identified gap. As such, treatment delivery is triggered if the identified gap is determined to be a newly identified gap.

In embodiments, in response to the similarity metric indicating that the identified interproximal gap is different from the one or more previously identified interproximal gaps, image data representing the identified interproximal gap is stored in a memory, e.g. for use in subsequent identification and/or comparison of interproximal gaps. As such, the gap can be compared to subsequently identified gaps, to determine whether the subsequently identified gaps have been encountered previously. In embodiments, the image data is stored in a library or data bank comprising image data and/or other representative data corresponding to previously identified gaps of the user. The image data may be stored on the device 100, or may be output for transmission to a remote device for storage, e.g. via a network.

In embodiments, in response to the similarity metric indicating that the identified interproximal gap is the same as at least one of the one or more previously identified interproximal gaps, the oral treatment device 100 is controlled to prevent treatment delivery to the identified interproximal gap. Therefore, the action performed at item 630 may comprise the prevention of treatment delivery. As such, repeated treatments of the same gap during a single oral treatment session may be reduced, and in some cases avoided altogether. In other words, each gap is only treated once during the oral treatment session. This allows for a more efficient use of the oral treatment device 100. In examples where the treatment comprises the delivery of working fluid via the fluid delivery system 220, for example, reducing repeated treatments of the same gap reduces the amount of working fluid used. In alternative embodiments, treatment delivery is not prevented in response to the similarity metric indicating that the identified gap is the same as at least one of the previously identified gaps.

In embodiments, in response to the similarity metric indicating that the identified interproximal gap is the same as at least one of the one or more previously identified interproximal gaps, an elapsed time is determined from when the at least one of the one or more previously identified interproximal gaps was previously identified. The determined elapsed time is compared with a predetermined threshold. In such embodiments, the oral treatment device 100 is controlled based on a result of the comparison of the determined elapsed time with the predetermined threshold. As such, the control of the device 100 may vary depending on how recently the gap was previously identified.

In embodiments, in response to the determined elapsed time being greater than the predetermined threshold, the oral treatment device 100 is controlled to deliver a treatment to the identified interproximal gap. Therefore, a repeated treatment of a gap may be performed if a predetermined amount of time has passed since the previous treatment of the gap. In embodiments, in response to the determined elapsed time being less than the predetermined threshold, the oral treatment device 100 is controlled to prevent treatment delivery to the identified interproximal gap. Therefore, a repeated treatment of a gap is not performed if a predetermined amount of time has not passed since the previous treatment of the gap. For example, a gap may be encountered twice in relatively quick succession if a user moves the device 100 back and forth in a 'scrubbing' motion. In this case, multiple treatments of the gap may not be effective and/or efficient. However, if a user returns the device 100 to a previously treated gap at a substantially later time in the session, it may be inferred that a further treatment of that gap is desired, e.g. that the previous treatment of the gap was not successful.

In embodiments, the generated image data is processed using a trained classification algorithm configured to detect interproximal gaps. Using such a trained algorithm results in a more accurate and/or reliable gap detection compared to a case in which a trained algorithm is not used. In embodiments, the classification algorithm comprises a machine learning algorithm. Such a machine learning algorithm may improve (e.g. increase accuracy and/or reliability of classification) through experience and/or training.

In embodiments, the generated image data is processed to determine the at least one characteristic of the identified interproximal gap. In embodiments, the at least one characteristic is determined by processing the generated image data using a machine learning algorithm. The machine learning algorithm is trained to identify information for use in distinguishing between interproximal gaps. Such information comprises features that are representative of the gap, i.e. non-redundant features, and/or features which are predicted to vary between gaps. The identified information may comprise the at least one characteristic of the gap. In embodiments, such a machine learning algorithm (or one or more different machine learning algorithms) is also used to determine the at least one characteristic of the one or more previously identified gaps, e.g. features that are representative of the previously identified gaps and/or useable to distinguish between gaps, and which are used to compare the previously identified gaps with the currently identified gap. In alternative embodiments, characteristic features of the gaps are extracted from raw image data without the use of machine learning algorithms.

In embodiments, the image sensor equipment 230 comprises an intraoral camera. In embodiments, the image sensor equipment 230 is at least partially comprised in a head 120 of the oral treatment device 100. Since the head 120 of the device 110 is for delivering a treatment inside the oral cavity of the user, arranging the image sensor equipment 230 at least partially in the head 120 allows for the inside of the oral cavity to be imaged, without requiring a separately mounted camera.

In embodiments, the image sensor equipment 230 is at least partially comprised in a handle 110 of the oral treatment device 100. By arranging the image sensor equipment 230 at least partially in the handle 110 of the device 100, on-device space may be managed more efficiently, and the cost of replacement parts (i.e. the head 120) reduced, as discussed above.

In embodiments where the oral treatment device comprises the fluid delivery system 220 for delivering working fluid to the oral cavity of the user, a control signal is outputted to the fluid delivery system 220 to control delivery of the working fluid based on the determined result of the comparison. As such, the action performed at item 630 may comprise controlling delivery of the working fluid (e.g. causing and/or preventing delivery of the working fluid). In embodiments, the fluid delivery system 220 comprises a fluid reservoir for storing the working fluid in the oral treatment device 100. Therefore, the frequency at which the fluid reservoir is required to be replenished can be reduced due to the comparing of the identified gap with previously identified gaps, which reduces the repeated jetting of fluid to the same gap.

FIG. 7 shows a method 700 of operating an oral treatment device, according to embodiments. The method 700 may be used to operate the oral treatment device 100 described above with reference to FIGS. 1A, 1B and 2. In the embodiments of FIG. 7, the oral treatment device 100 comprises the IMU 240. The IMU 240 is operable to output signals dependent on position and/or movement of the oral treatment device 100. In these embodiments, the oral treatment device 100 also comprises the fluid delivery system 220 for delivering working fluid to the oral cavity of a user. In embodiments, the method 700 is performed at least in part by the controller 210.

In step 710, signals received from the IMU 240 indicating position and/or movement of the oral treatment device 100 relative to the oral cavity of the user are processed.

In step 720, on the basis of the processing of step 710, a control signal is outputted to the fluid delivery system 220 to control delivery of the working fluid.

Therefore, delivery of the working fluid by the fluid delivery system 220 is controlled based on the IMU signals. This allows for an increase in the accuracy of fluid delivery, e.g. the jetting of working fluid, compared to a case in which IMU signals are not used to control the fluid delivery system 220.

In embodiments, the control signal is operable to cause prevention of delivery of working fluid by the fluid delivery system 220. By selectively preventing the delivery of working fluid based on the IMU signals, less working fluid is used compared to a case in which delivery is not selectively prevented. As such, the efficiency of the device 100 is improved.

In embodiments, the signals received from the IMU are processed to determine that the oral treatment device is being moved according to a predetermined movement type. In response to the determination, the control signal is outputted to the fluid delivery system 220 to prevent delivery of the working fluid. Therefore, the delivery of working fluid to the oral cavity of the user is selectively prevented based on how the device 100 is being moved by the user. This allows for a more efficient use of the device 100 and/or more effective treatment, e.g. by not allowing working fluid to be jetted when the device 100 is being moved in a particular manner. For example, if the device 100 is being moved according to the predetermined movement type, there may be an increased likelihood of the fluid delivery system 220 misfiring, and/or of damage being caused by the jetting of the fluid. In embodiments, the signals received from the IMU 240 are processed using a trained classification algorithm, e.g. a machine learning algorithm, configured to determine whether the device 100 is being moved according to the predetermined movement type.

In embodiments, movement of the oral treatment device 100 according to the predetermined movement type impedes the use of the oral treatment device 100 in treating the oral cavity of the user. Therefore, fluid delivery can be selectively prevented when the device 100 is being used in a manner that impedes the use of the device 100 in treating the oral cavity. If the device is being moved in such a manner, the likelihood of successful treatment is reduced, e.g. due to a reduction in accuracy of the fluid delivery system 220 in delivering working fluid to a target. This means that working fluid is likely to be wasted, e.g. due to being jetted by the fluid delivery system 220 but not resulting in a successful treatment. By selectively preventing fluid delivery when the device 100 is being moved according to the predetermined movement type, the working fluid is used more efficiently.

In embodiments, the predetermined movement type comprises a scrubbing movement. If the device 100 is being moved according to a scrubbing movement type, the accuracy of the fluid delivery system 220 in delivering working fluid to a target, e.g. an interproximal gap, is reduced, and the likelihood of misfiring is increased. This means that working fluid is more likely to be wasted. Therefore, by selectively preventing fluid delivery when the device 100 is moved in a scrubbing motion, working fluid is used more efficiently. The predetermined movement type comprises other movement types in alternative embodiments.

In embodiments, the signals received from the IMU 240 are processed to determine an orientation of the oral treatment device 100. The control signal is outputted to the fluid delivery system 220 based on the determined orientation. Therefore, the fluid delivery system 220 can be controlled based on the current orientation of the device 100, as determined using the IMU signals. The likelihood that the fluid delivery system 220 will provide a successful treatment may be dependent on the orientation of the device 100. For example, where the working fluid is to be jetted into an interproximal gap between adjacent teeth to dislodge an obstruction, this may be more likely to succeed (with fewer attempts) if the device 100 is orientated such that the nozzle of the fluid delivery system 220 extends substantially perpendicular to, and facing towards, the buccal or lingual surfaces of the teeth. If, on the other hand, the device 100 is orientated such that the nozzle extends substantially perpendicular to, and facing towards, the occlusal surface of the teeth, the likelihood of successfully dislodging the obstruction is reduced. This means that working fluid is more likely to be wasted, e.g. due to being jetted from the fluid delivery system 220 but not resulting in a successful treatment. By controlling fluid delivery based on the determined orientation of the device 100, working fluid is used more efficiently.

In embodiments, the orientation of the device 100 is compared to a jetting angle threshold. The jetting angle threshold is a threshold for determining whether or not working fluid delivery should be prevented or permitted, based on the orientation of the head 120 of the device 100. For example, when the orientation of the head 120 is above the jetting angle threshold, fluid delivery may be permitted, and when the orientation of the head 120 is below the jetting angle threshold, fluid delivery may be prevented. In embodiments, a jetting angle threshold may be determined for the user, based on the IMU signals. The jetting angle threshold may be optimised for the specific user by analysing the orientation of the head 120 as the user moves the device 100 along a row of teeth, i.e. since different users may orientate and/or move the device 100 differently along a pass. A "pass" as used herein refers to the movement of the head 120 of the device 100 along a row of teeth.

In embodiments, the signals received from the IMU 240 are processed to determine a change in orientation of the oral treatment device 100 during use of the oral treatment device 100. The control signal is outputted to the fluid delivery system 220 based on the determined change in orientation of the oral treatment device 100. As such, fluid delivery may be controlled in response to a change in orientation of the device 100 during use. For example, the device 100 may be moved from a first orientation in which the likelihood of successful treatment is relatively low, e.g. where the nozzle is orientated substantially perpendicular to, and facing towards, the occlusal surface of the teeth, to a second orientation in which the likelihood of successful treatment is relatively high, e.g. where the nozzle is orientated substantially perpendicular to, and facing towards, the lingual or buccal surfaces of the teeth. When the device 100 is in the first orientation, fluid delivery may be prevented, in order to reduce usage of working fluid by jetting the working fluid where there is a relatively low likelihood of successful treatment. When the device 100 moves to the second orientation, fluid delivery prevention may be ceased. Similarly, if the device 100 moves from the second orientation to the first orientation, fluid delivery may be selectively prevented.

In embodiments, the head 120 of the device 100 is operable to be moved along a row of teeth between a first end of the row and a second end of the row, and the fluid delivery system 220 is at least partly comprised in the head 120. In embodiments, the signals received from the IMU 240 are processed to determine a trajectory of the head 120 of the oral treatment device 100 between the first end of the row and the second end of the row. The control signal is outputted to the fluid delivery system 220 based on the determined trajectory. By controlling the fluid delivery system 220 based on the trajectory of the head 120 as it moves along a row of teeth, the device 100 can be controlled in a more intelligent and/or flexible manner. In particular, fluid delivery may be prevented (thereby preventing working fluid from being wasted) when the trajectory indicates that successful treatment using the fluid delivery system 220 is relatively unlikely.

In embodiments, the signals received from the IMU 240 are processed to determine a change in orientation of the head 120 of the oral treatment device 100 during movement of the head 120 of the oral treatment device 100 between the first end of the row and the second end of the row. The control signal is outputted to the fluid delivery system 220 based on the determined change in orientation of the head 120. Therefore, fluid delivery may be controlled in response to a change in orientation of the head 120 as the head 120 is moved along a row of teeth. For example, as a user moves the device 100 along the row of teeth, the orientation of the head 120 may change, e.g. the user may rotate the device 100 as the device 100 is moved along the row of teeth. By taking such changes of orientation into account, the fluid delivery system 220 is made more accurate and/or efficient, e.g. by delivering jets of working fluid when it is determined, based on orientation, that there is a relatively high likelihood of successful treatment, and preventing jetting when it is determined that there is a relatively low likelihood of successful treatment.

In embodiments, the signals received from the IMU 240 are processed to determine that movement of the oral treatment device 100 relative to the oral cavity has ceased. In response to the determination, the control signal is outputted to the fluid delivery system 220 to cause the fluid delivery system 220 to deliver the working fluid. Therefore, a user may move the device 100 along a row of teeth and pause when the device 100 is adjacent to an interproximal gap that the user wishes to be treated. By detecting such a pause using IMU signals and automatically triggering the fluid delivery system 220 accordingly, the need for user input to trigger the fluid delivery system 220 is reduced, thereby increasing the functionality of the device 100 and improving the user experience.

In embodiments, the signals received from the IMU 240 are processed to detect an interproximal gap between adjacent teeth in the oral cavity of the user. The control signal is outputted to the fluid delivery system 220 in response to detecting the interproximal gap. In embodiments, the control signal is outputted to the fluid delivery system 220 to cause the fluid delivery system to deliver working fluid to the detected interproximal gap. As such, interproximal gaps can be detected automatically based on the IMU signals during use of the device 100, in substantially real time, and the working fluid delivered to the detected gap during the use of the device 100. In some cases, the user may be unaware that a particular gap exists, whereas the gap can still be detected by the device based on IMU signals. Further, the efficiency and/or accuracy of the fluid delivery system 220 is increased, by specifically triggering the jetting of working fluid when a gap is detected.

In embodiments, the IMU signals are processed using a velocity and/or position estimation algorithm. For example, the velocity and/or position estimation algorithm may be configured to estimate the velocity of the device 100, for use in detecting rapidly changing velocity in any direction (e.g. to detect a scrubbing motion). In embodiments, the velocity and/or position estimation algorithm is configured to be fed accelerometer and gyroscope signals from an IMU. These signals can be processed in isolation or be fused into one data stream for use by the algorithm. For example, determining that the device is moving along a row of teeth, determining a position of the device relative to the oral cavity, and/or determining the speed of the device, may be performed through use of the velocity and/or position estimation algorithm. The velocity and/or position estimation algorithm may be implemented using software or hardware, e.g. an application specific integrated circuit (ASIC), or may be implemented using a combination of hardware and software. The velocity and/or position estimation algorithm may be used in various methods described herein.

IMUs may suffer from noise, biases and/or drifts which, unless properly corrected for, can cause inaccuracies in the resulting calculations. For example, gyroscope signals may drift over time, the accelerometer may be biased by gravity, and both gyroscope and accelerometer signals may suffer from noise. In embodiments, at least some of the noise in the IMU signals is removed using filtering, for example high and/or low pass and/or median filters. In embodiments, filters are used to correct for gyroscope drift and/or compensate for gravity, thereby allowing a linear velocity to be obtained, and then the velocity may be integrated to obtain a position and/or displacement. The velocity and/or position measurements may comprise measurements for all 3 axes individually, or the directional components may be combined to provide a velocity magnitude and/or a position magnitude.

In embodiments, the IMU signals are processed to generate a user behaviour profile for the user. Such a profile is indicative of how the user uses the device 100, e.g. a routine based on movement, orientation, speed, etc. The user behaviour profile may be used to provide tailored advice to the user, for example. The user behaviour profile may be modified and/or updated as new IMU data is obtained.

In embodiments, the IMU signals are combined with intraoral image data generated by image sensor equipment, e.g. the image sensor equipment 230 described above. By using both IMU signals and intraoral image data to control the fluid delivery system 220, the accuracy of the fluid delivery system 220 may be further increased, compared to a case in which intraoral image data is not used.

FIG. 8 shows a method 800 of operating an oral treatment device, according to embodiments. The method 800 may be used to operate the oral treatment device 100 described above with reference to FIGS. 1A, 1B and 2. In the embodiments of FIG. 8, the oral treatment device 100 comprises a head 120 for use in treating an oral cavity of a user. The oral cavity comprises a plurality of oral cavity zones. In these embodiments, the oral treatment device 100 comprises the IMU 240. The IMU 240 is operable to output signals dependent on position and/or movement of the head 120 of the oral treatment device 100. In embodiments, the method 800 is performed at least in part by the controller 210.

In step 810, signals indicating position and/or movement of the head 120 of the oral treatment device 100 relative to the oral cavity of the user are received from the IMU 240.

In step 820, the received signals are processed using a trained non-linear classification algorithm to obtain classification data. The classification algorithm is trained to identify, from the plurality of oral cavity zones, an oral cavity zone in which the head 120 of the oral treatment device 100 is located. The obtained classification data indicates the oral cavity zone in which the head 120 of the oral treatment device 100 is located.

In step 830, the oral treatment device 100 is controlled to perform an action using the classification data.

In embodiments, the plurality of oral cavity zones comprises more than two oral cavity zones. In embodiments, the plurality of oral cavity zones comprises more than four oral cavity zones. In embodiments, the plurality of oral cavity zones comprises 12 oral cavity zones. In embodiments, the plurality of oral cavity zones comprises 18 oral cavity zones.

In embodiments, a given oral cavity zone of the plurality of oral cavity zones is indicative of: a quadrant or sextant of the oral cavity of the user; and a tooth surface selected from a list comprising: buccal, lingual, and occlusal tooth surfaces. As such, there may be 18 distinct oral cavity zones, corresponding to six oral cavity sextants each having three dental surfaces. The plurality of oral cavity zones comprises more than 18 oral cavity zones in alternative embodiments.

By using the IMU signals as inputs to a trained non-linear classification algorithm, the oral cavity zone in which the head 120 is located can be identified without the need for user input. The device 100 can therefore autonomously identify how the user is using the device 100, and adapt itself accordingly. For example, one or more operating settings of the device 100 can be controlled according based on the identified oral cavity zone. Further, this can allow the user to be notified as to where the head 120 of the device 100 is within the oral cavity, how much time is being spent in each zone, etc. This information can also be used to determine whether the oral cavity zone in which the head 120 is located has been visited previously in the current oral treatment session. As well as providing direct user feedback, such information can facilitate the generation of a behaviour profile indicating how the user tends to use the device 100, based on, for example, the time spent in each oral cavity zone, whether any oral cavity zones have been missed, etc. Further, using a trained algorithm results in a more accurate and/or reliable localisation of the head 120 compared to a case in which a trained algorithm is not used. That is, the spatial resolution of localisation of the head 120 is increased through use of the trained algorithm. Moreover, a non-linear classification algorithm can be used to distinguish between factors that are not linearly separable. Therefore, using a non-linear classification algorithm to obtain the classification data results in a more accurate and/or reliable determination of the classification data.

In embodiments, the classification algorithm comprises a machine learning algorithm. Such a machine learning algorithm may improve (e.g. increase accuracy and/or reliability of classification) through experience and/or training.

In embodiments, the oral treatment device comprises a machine learning agent. The machine learning agent comprises the classification algorithm. As such, the classification algorithm may be located on the oral treatment device 100. Performing the identifying of the oral cavity zone on the device 100 reduces latency compared to a case in which the classification algorithm is not located on the device 100, since data is not required to be transmitted to and/or received from another device. This enables the oral cavity zone to be identified more quickly, thereby reducing the time taken for any corrective action to be taken, and/or for an output to be provided via a user interface. In alternative embodiments, the classification algorithm is located on a remote device. Such a remote device may, for example, have more processing resources than the oral treatment device 100.

In embodiments, the oral treatment device 100 is controlled to deliver a treatment to the oral cavity of the user based on the classification data. As such, the action performed at item 830 may comprise delivery of a treatment to the oral cavity of the user.

In embodiments where the oral treatment device comprises the fluid delivery system 220 for delivering working fluid to the oral cavity of the user, a control signal may be outputted to the fluid delivery system 220 to control delivery of the working fluid based on the classification data. As such, the action performed at item 830 may comprise control of delivery of the working fluid by the fluid delivery system 220. In embodiments, the control signal is operable to cause prevention of the delivery of the working fluid based on the classification data. This improves the efficiency and/or accuracy of the fluid delivery system 220, i.e. by taking the determined intraoral location of the head 120 of the device 100 into account when delivering (or not delivering) treatment.

In embodiments, a user interface 250 is caused to provide an output dependent on the classification data. As such, the action performed at item 830 may comprise providing the output via the user interface 250. For example, such an output may comprise a notification notifying the user to spend more time in a particular oral cavity zone, in order to improve the use of the device 100 in delivering treatment.

In embodiments, the user interface 250 is caused to provide the output during use of the oral treatment device 100 in treating the oral cavity of the user. By causing the user interface 250 to provide the output during the use of the device 100, rather than after the oral treatment session is complete, feedback can be provided more promptly. For example, the output may be provided by the user interface 250 in substantially real-time. This allows the user to adjust their behaviour, e.g. to take corrective action, during the use of the device 100, thereby to improve the efficacy of treatment delivery.

In embodiments, the user interface 250 is caused to provide the output after use of the oral treatment device 100 in treating the oral cavity of the user. Providing the output after the use of the device 100 allows for a more detailed level of feedback to be provided compared to a case in which the output is provided during the use. For example, the use and/or movement of the device 100 may be analysed throughout the oral treatment session, and feedback on the overall session may then be provided to the user, e.g. advising the user to spend more time treating a given oral cavity zone. Such feedback encourages the user to adjust their behaviour in subsequent sessions.

In embodiments, the output provided by the user interface comprises an audio, visual and/or haptic output. For example, the output may be provided via a display, a speaker and/or a haptic actuator.

In embodiments, the user interface is comprised in a remote device, and a signal is outputted to the remote device to cause the user interface to provide the output. A user interface on such a remote device may be more versatile than a user interface on the oral treatment device 100 itself, which may be hand-held and/or have limited space for a user interface.

In embodiments, the oral treatment device 100 comprises the user interface 250. By providing the user interface 250 on the oral treatment device 100, the output may be generated and received by the user more quickly compared to a case in which the user interface 250 is not comprised on the oral treatment device 100, since the need for communications between different devices is avoided. Further, providing the user interface 250 on the oral treatment device 100 may increase a likelihood that the user receives the feedback promptly. For example, the user may not be in the same location as the remote device during use of the oral treatment device 100, and therefore the user may not see/hear a notification on the remote device promptly.

In embodiments, a user interface (e.g. on the device 100 or on a remote device) is caused to provide an output comprising a notification notifying the user to position the head 120 of the oral treatment device 100 in a predetermined oral cavity zone. Such a notification is provided at the start of an oral treatment session. By providing such a notification to the user, the non-linear classification algorithm is made aware of the starting location of the head 120, i.e. the oral cavity zone in which the head 120 is located at the start of the session. This can then be used as a constraint for the classification algorithm, which allows for an increase in the accuracy and/or reliability of the algorithm in determining subsequent intraoral locations of the head 120.

In embodiments, the classification algorithm is modified using the received signals from the IMU 240. That is, the classification algorithm may be trained and/or further trained using the signals generated by the IMU 240. Modifying the classification algorithm allows the accuracy and/or reliability of the algorithm to improve through experience and/or using more training data. Further, modifying the classification algorithm allows the classification algorithm to be tailored to the user. By using the generated IMU signals as training data to dynamically re-train the classification algorithm, the classification algorithm can more reliably identify the oral cavity zone in which the head 120 of the device 100 is located.

In embodiments, the classification data is stored in the memory 260. This allows the data to be used at a subsequent time, e.g. for post-treatment analysis and/or generating a behaviour profile of the use of the device 100 for the user. In embodiments, the classification data is outputted for transmission to a remote device, e.g. a user device such as a mobile telephone, tablet, laptop, personal computer, etc.

In embodiments, training data is received from a remote device. The training data may be received from a network, e.g. 'the Cloud'. Such training data may comprise IMU data and/or classification data associated with other users. Such training data may comprise crowd-sourced data, for example. In embodiments, such training data is greater in volume than IMU data and/or classification data obtained using the oral treatment device 100 directly. The use of the training data from the remote device to modify the classification algorithm can increase the accuracy and/or reliability of the classification algorithm compared to a case in which such training data is not used.

FIG. 9 shows a method 900 of operating an oral treatment device, according to embodiments. The method 900 may be used to operate the oral treatment device 100 described above with reference to FIGS. 1A, 1B and 2. In the embodiments of FIG. 9, the oral treatment device 100 comprises a head for use in treating an oral cavity of a user. In these embodiments, the oral treatment device 100 also comprises the IMU 240 and image sensor equipment 230. The image sensor equipment 230 comprises intraoral image sensor equipment in the embodiments of FIG. 9. In embodiments, the method 900 is performed at least in part by the controller 210.

In step 910, signals are generated, using the IMU 240, dependent on position and/or movement of the head of the oral treatment device 100 relative to the oral cavity of the user.

In step 920, image data is generated, using the image sensor equipment 230, representing at least a portion of the oral cavity of the user. It will be understood that steps 910 and 920 may be performed substantially simultaneously, or sequentially in either order.

In step 930, the generated signals and the generated image data are processed using a trained classification algorithm to determine an intraoral location of the head 120 of the oral treatment device 100.

In step 940, the oral treatment device 100 is controlled to perform an action based on the determined intraoral location.

By using the IMU signals and image data as inputs to a trained classification algorithm, the intraoral location of the head 120 of the device 100 can be determined without the need for user input. The device 100 can therefore autonomously identify how the user is using the device 100, and adapt itself accordingly. This allows for a more intelligent control of the device 100. For example, one or more operating settings of the device 100 can be controlled according to the determined intraoral location. Further, the use of image data in combination with IMU data provides a more accurate determination of the intraoral location of the head 120 compared to a case in which image data and/or IMU data is not used. For example, the spatial resolution of intraoral location determination is improved through use of the image data in combination with the IMU data.

In embodiments, the oral cavity comprises a plurality of oral cavity zones. In such embodiments, the generated signals and the generated image data are processed to identify, from the plurality of oral cavity zones, an oral cavity zone in which the head 120 is located. The oral treatment device 100 is controlled to perform the action based on the identified oral cavity zone. In embodiments, a given oral cavity zone of the plurality of oral cavity zones is indicative of: a quadrant or sextant of the oral cavity; and a tooth surface selected from a list comprising: buccal, lingual, and occlusal tooth surfaces, as discussed above. This can allow, for example, the user to be notified as to where the head 120 of the device 100 is within the oral cavity, how much time is being spent in each oral cavity zone, etc. This information can also be used to determine whether the oral cavity zone in which the head 120 is located has been visited previously in the current oral treatment session. As well as providing direct user feedback, such information can facilitate the generation of a behaviour profile indicating how the user tends to use the device 100, based on, for example, the time spent in each oral cavity zone, whether any oral cavity zones have been missed, etc.

In embodiments, the oral cavity comprises a plurality of teeth, and the generated signals and the generated image data are processed to identify, from the plurality of teeth, a tooth that is adjacent to (e.g. nearest to) the head 120 of the oral treatment device 100. The oral treatment device 100 is controlled to perform the action based on the identified tooth. As such, the intraoral location of the head 120 of the device 100 is determined at a per tooth level. This can allow, for example, user feedback to be provided informing the user which specific teeth require additional treatment, etc. As such, a more fine-grained and/or tailored level of feedback can be provided (e.g. with a higher spatial resolution) compared to a case in which the tooth that is adjacent to the head 120 of the device 100 is not identified.

In embodiments, the generated signals and the generated image data are processed to identify an interproximal gap between adjacent teeth in the oral cavity of the user. The oral treatment device 100 is controlled to perform the action based on the identified interproximal gap. As such, interproximal gaps can be detected automatically based on the IMU signals and image data during use of the device 100. In some cases, the user may be unaware that a particular gap exists, whereas the gap can still be detected by the device 100 based on the IMU signals and image data. As a result of gap detection, the user may be notified of the location of the gap, the device 100 may be controlled to deliver a treatment to the gap, etc. As such, the intraoral location of the head 120 of the device 100 is determined at a per gap level. The method described herein therefore has a higher spatial resolution than other methods. In embodiments, identifying the gap is a separate process to identifying the oral cavity zone in which the head 120 is located. For example, it may first be determined that the head 120 is proximate to a gap between adjacent teeth, and it may additionally be determined that the head 120 is in a particular oral cavity zone (i.e. region) of the mouth. This facilitates the localisation of the detected gap.

In embodiments, the classification algorithm comprises a machine learning algorithm. Such a machine learning algorithm may improve (e.g. increase accuracy and/or reliability of classification) through experience and/or training.

In embodiments, the oral treatment device 100 comprises a machine learning agent, the machine learning agent comprising the classification algorithm. As such, the classification algorithm may be located on the oral treatment device 100. Performing the determining of the intraoral location on the device 100 reduces latency compared to a case in which the classification algorithm is not located on the device 100, since data is not required to be transmitted to and/or received from another device. This enables the intraoral location to be determined more quickly, thereby reducing the time taken for any corrective action to be taken, and/or for an output to be provided via a user interface. In alternative embodiments, the classification algorithm is located on a remote device, e.g. a device with more processing resources than the oral treatment device 100.

In embodiments, the classification algorithm is modified using the generated signals and/or the generated image data. That is, the classification algorithm may be trained and/or further trained using the generated signals and/or the generated image data. Modifying the classification algorithm allows the accuracy and/or reliability of the algorithm to improve through experience and/or using more training data. That is, a confidence level of the determined intraoral location may be increased. Further, modifying the classification algorithm allows the classification algorithm to be tailored to the user. By using the generated signals and/or the generated image data as training data to dynamically re-train the classification algorithm, the classification algorithm can more reliably determine the intraoral location of the head 120 of the device 100.

In embodiments, the oral treatment device 100 is controlled to deliver a treatment to the oral cavity of the user based on the determined intraoral location. As such, the action performed at item 940 may comprise treatment delivery by the device 100.

In embodiments where the oral treatment device 100 comprises a fluid delivery system 220 for delivering working fluid to the oral cavity of the user, a control signal is outputted to the fluid delivery system 220 to control delivery of the working fluid based on the determined intraoral location. As such, the action performed at item 940 may comprise the control of the fluid delivery system 220. For example, the intraoral location may be used to determine whether or not to trigger a burst of working fluid. This improves the efficiency and/or accuracy of the fluid delivery system 220, i.e. by taking the determined intraoral location of the head 120 of the device 100 into account when delivering (or not delivering) treatment.

In embodiments, a user interface 250 is caused to provide an output dependent on the determined intraoral location. As such, the action performed at item 940 may comprise providing an output via the user interface 250. In embodiments, the user interface 250 is caused to provide the output during use of the oral treatment device 100 in treating the oral cavity of the user. By causing the user interface 250 to provide the output during the use of the device 100, rather than after the oral treatment session is complete, feedback can be provided more promptly. For example, the output may be provided by the user interface 250 in substantially real-time. This allows the user to adjust their behaviour, e.g. to take corrective action, during the use of the device 100, thereby to improve the efficacy of treatment delivery.

In embodiments, the user interface 250 is caused to provide the output after use of the oral treatment device 100 in treating the oral cavity of the user. Providing the output after the use of the device 100 allows for a more detailed level of feedback to be provided compared to a case in which the output is provided during the use. For example, the use and/or movement of the device may be analysed throughout the oral treatment session, and feedback on the overall session may then be provided to the user. In embodiments, the user interface 250 is caused to provide an output both during and after the use of the device 100.

In embodiments, the output provided by the user interface comprises an audio, visual and/or haptic output. For example, the output may be provided via a display, a speaker and/or a haptic actuator.

In embodiments, the user interface is comprised in a remote device, e.g. a user device such as a mobile telephone. In such embodiments, a signal is outputted to the remote device to cause the user interface to provide the output. A user interface on such a remote device may be more versatile than a user interface on the oral treatment device 100 itself.

In embodiments, the oral treatment device 100 comprises the user interface 250. By providing the user interface 250 on the oral treatment device 100, the output may be generated and received by the user more quickly compared to a case in which the user interface 250 is not comprised on the oral treatment device 100, since the need for communications between different devices is avoided. Further, providing the user interface 250 on the oral treatment device 100 may increase a likelihood that the user receives the feedback more promptly.

In embodiments, data indicating the determined intraoral location is outputted for storage in the memory 260. This allows the data to be used at a subsequent time, e.g. for post-treatment analysis and/or generating a behaviour profile of the use of the device 100 for the user. In embodiments, data indicating the determined intraoral location is outputted for transmission to a remote device, e.g. a user device.

In embodiments, the determined intraoral location of the head 120 of the device 100 is used as part of an interproximal gap detection and treatment process, such as one or more of the methods described above with reference to FIGS. 3 to 6. In embodiments, the determined intraoral location of the head 120 is used in a plaque detection process, e.g. using qualitative plaque fluorescence.

FIG. 10 shows a method 1000 of operating an oral treatment device, according to embodiments. The method 1000 may be used to operate the oral treatment device 100 described above with reference to FIGS. 1A, 1B and 2. In the embodiments of FIG. 10, the oral treatment device 100 comprises the IMU 240. The IMU 240 is operable to output signals dependent on movement of the oral treatment device 100. In embodiments, the method 1000 is performed at least in part by the controller 210.

In step 1010, signals indicating movement of the oral treatment device 100 relative to the oral cavity of the user are received.

In step 1020, the received signals are processed using a trained classification algorithm to obtain classification data. The classification algorithm is configured (e.g. trained) to determine whether the oral treatment device 100 is being moved according to a predetermined movement type.

In step 1030, the oral treatment device 100 is controlled to perform an action using the classification data.

By using the signals from the IMU 240 as an input to a classification algorithm, a current movement type of the device 100 can be recognised. The device 100 can therefore autonomously identify how the user is moving the device 100, and adapt itself accordingly. This allows for a more intelligent control of the device 100. For example, one or more operating settings of the device 100 can be controlled according to the identified behaviour. This allows the settings of the device 100 to correspond more closely with how the user is using the device 100. Using a trained algorithm results in a more accurate and/or reliable classification of movement types compared to a case in which a trained algorithm is not used.

In embodiments, movement of the oral treatment device 100 according to the predetermined movement type impedes the use of the oral treatment device 100 in treating the oral cavity of the user. Therefore, it may be determined when the device 100 is being moved in such a way that the likelihood of successful treatment delivered by the device 100 is reduced. The user may be warned accordingly, and/or the device 100 controlled, based on such a determination. For example, in embodiments, the predetermined movement type comprises a scrubbing movement. A scrubbing movement comprises a rapid back-and-forth movement. Such a movement type impedes the effective delivery of some treatments, e.g. the delivery of working fluid to an interproximal gap between teeth. Therefore, by determining whether the device 100 is being moved in such a manner, corrective action can be taken, either by the user once they are informed by the device 100 that the movement type is impeding effective treatment, or by the device 100 itself, e.g. by controlling the delivery of treatment.

In embodiments, in response to the classification data indicating that the oral treatment device 100 is being moved according to the predetermined movement type, treatment delivery by the oral treatment device 100 in the oral cavity of the user is prevented. As such, the action performed at item 1030 may comprise the prevention of treatment delivery. As discussed above, when the device 100 is being moved according to the predetermined movement type, the use of the device 100 in effectively treating the oral cavity of the user may be impeded, i.e. negatively affected. Therefore, by preventing treatment delivery when it is determined that the device 100 is being moved according to the predetermined type, the device 100 is operated more efficiently.

That is, delivery of treatment is not attempted where there is determined to be a relatively low likelihood of success, due to the manner in which the device 100 is being moved.

In embodiments, in response to the classification data indicating that the oral treatment device 100 is not being moved according to the predetermined movement type, the oral treatment device 100 is controlled to deliver a treatment in the oral cavity of the user. As such, delivery of treatment may be triggered by a determination that the device 100 is not being moved according to the predetermined movement type, e.g. a determination that the device 100 is not being moved with a scrubbing motion. Hence, if it is determined that the device 100 is being moved according to the predetermined type, treatment delivery may be prevented, and if it is determined that the device 100 is not being moved according to the predetermined movement type, treatment delivery may be triggered (or allowed to be triggered). Therefore, the movement type of the device 100 is used as a condition to decide whether or not to perform the treatment delivery.

In embodiments, in response to the classification data indicating that the device 100 is being moved according to a further predetermined movement type, the device 100 is controlled to deliver a treatment to the oral cavity of the user. In examples where the predetermined movement type comprises a scrubbing motion, for example, the further predetermined movement type may comprise no motion or a 'smooth' gliding motion, which is different from the scrubbing motion. As such, a user may be discouraged from using the predetermined movement type and encouraged to use to the further predetermined movement type, in order to improve the efficiency and/or effectiveness of treatment delivery.

In embodiments where the oral treatment device 100 comprises a fluid delivery system 220 for delivering working fluid to the oral cavity of the user, a control signal is outputted to the fluid delivery system 220 to control delivery of the working fluid based on the classification data. As such, the action performed at item 1030 may comprise controlling the fluid delivery system 220. For example, delivery of the working fluid may be prevented if it is determined that the device 100 is being moved according to the predetermined movement type. The user may be moving the device 100 in a manner which impedes the accurate and/or reliable delivery of working fluid to a target, e.g. an interproximal gap between adjacent teeth. For example, if the device 100 is being moved too quickly, e.g. in a scrubbing motion, the fluid delivery system 220 is less likely to deliver a jet of working fluid where it is actually intended, e.g. an interproximal gap. This may be a particular consideration where the coverage area of the fluid jet is relatively small (i.e. focused). This means working fluid is more likely to be wasted, due to missing a target, and effective treatment less likely to be achieved (at least without repeated fluid jetting attempts). By controlling the fluid delivery system 220 based on whether the device 100 is being moved according to the predetermined movement type, the accuracy and/or efficiency of the fluid delivery system 220 is increased, and the amount of working fluid used and/or wasted is reduced.

In embodiments, the method of FIG. 10 is performed in conjunction with an image-based interproximal gap detection and treatment process, e.g. the method of FIG. 4 described above. In such embodiments, the detection of an interproximal gap may be impeded if the device 100 is being moved with a scrubbing movement, due to the image sensor equipment 230 moving too quickly. Even if the gap is detected successfully, the scrubbing movement may impede the accuracy of the fluid delivery system 220 in delivering a jet of working fluid to the detected gap. Therefore, by selective preventing treatment delivery if it is determined that the device 100 is being moved according to the predetermined movement type, the performance of the interproximal gap detection and treatment process is improved.

In embodiments, features are extracted from the received IMU signals in substantially real-time, i.e. during use of the device 100. A sliding window may be applied to the IMU signals to extract the features from the signals (e.g. one or more average values). Such extracted features are input into the trained classification algorithm, which determines whether or not the device 100 is being moved according to the predetermined movement type. In embodiments, the IMU 240 comprises a 6-axis IMU, providing accelerometer and gyroscope data. In alternative embodiments, only one of the accelerometer data and gyroscope data are provided by the IMU 240.

In embodiments, the IMU signals are sampled at a predetermined sampling rate, for analysis by the trained classification algorithm. The sampling rate may be predetermined based on the available computational resources of the device 100, whether the analysis will be performed on a remote device rather than on the device 100 itself, etc. For example, sampling the IMU signals relatively infrequently may be less computationally expensive than a case in which the IMU signals are sampled relatively frequently. However, sampling the IMU signals less frequently may also increase the latency between obtaining the signals and controlling the device 100, and/or may reduce the accuracy of the determination of movement type made by the classification algorithm. Therefore, there may be a trade-off between performance and processing resources when determining the sampling rate of the IMU signals.

In embodiments, in response to the classification data indicating that the oral treatment device 100 is being moved according to the predetermined movement type, a user interface is caused to provide an output. For example, the device 100 may comprise the user interface 250 described above with reference to FIG. 2, and the user interface 250 may be caused to provide the output. As such, the action performed at item 1030 may comprise providing the output via the user interface 250. By providing an output to the user, the user can be notified that the device 100 is being moved in such a way that effective treatment using the device 100 is impeded, thereby prompting the user to take corrective action. In embodiments, the output provided by the user interface 250 comprises an audio, visual and/or haptic output. For example, the output provided via the user interface 250 may comprise a flashing light, an audio tone and/or a vibration.

In embodiments, the user interface 250 is caused to provide the output during use of the oral treatment device in treating the oral cavity of the user. By causing the user interface 250 to provide the output during the use of the device 100, rather than after the oral treatment session is complete, feedback can be provided more promptly. For example, the output may be provided by the user interface 250 in substantially real-time. This allows the user to adjust their behaviour, e.g. to take corrective action, during the use of the device 100, thereby to improve the efficacy of treatment delivery.

In embodiments, the user interface 250 is caused to provide the output after use of the oral treatment device 100 in treating the oral cavity of the user. Providing the output after the use of the device 100 allows for a more detailed level of feedback to be provided compared to a case in which the output is provided during the use. For example, the use and/or movement of the device 100 may be analysed throughout the oral treatment session, and feedback on the overall session may then be provided to the user. Such feedback encourages the user to adjust their behaviour in subsequent sessions.

In embodiments, user feedback is provided both during the use of the device 100 (e.g. in substantially real-time) and after the treatment session has ended. For example, a user interface 250 of the device 100 may provide an indication to a user, during the use of the device 100, that the device 100 is being moved sub-optimally, e.g. in a scrubbing motion. In addition, a further user interface arranged on a remote device may provide a more detailed analysis of the user's behaviour after the treatment session has ended. This allows the user to adjust how they will use the device 100 in subsequent sessions.

In embodiments, the oral treatment device 100 comprises the user interface 250. By providing the user interface 250 on the oral treatment device 100, the output may be generated and received by the user more quickly compared to a case in which the user interface is not comprised on the oral treatment device, since the need for communications between different devices is avoided. Further, providing the user interface on the oral treatment device 100 may increase a likelihood that the user receives the feedback promptly.

In embodiments, the user interface is comprised in a remote device, e.g. a user device. In such embodiments, a signal is outputted to the remote device to cause the user interface to provide the output. Such a signal may be transmitted wirelessly, e.g. via Bluetooth™ technology, to the remote device. A user interface on such a remote device may be more versatile than a user interface on the oral treatment device itself. For example, since the oral treatment device 100 is generally hand-held and may have various other components, the amount of space on the oral treatment device 100 that is available for a user interface may be limited.

In embodiments, the classification algorithm is modified using the received signals from the IMU 240. That is, the classification algorithm may be trained and/or further trained using the IMU signals. Modifying the classification algorithm allows the accuracy and/or reliability of the algorithm to improve through experience and/or using more training data. That is, a confidence level of the determined movement type may be increased. Further, modifying the classification algorithm allows the classification algorithm to be tailored to the user. For example, an initial classification algorithm may be provided on the device 100, but the initial classification algorithm does not take into account specific behaviours of a given user. The user may move the device 100 in a particular manner, different from other users, for example. By using the generated signals as training data to dynamically re-train the classification algorithm, the classification algorithm can more reliably determine whether the device 100 is being moved according to the predetermined movement type.

In embodiments, the classification algorithm is retrained (e.g. modified) using the received signals from the IMU 240, such that the retrained classification algorithm is configured to determine whether the oral treatment device is being moved according to a further movement type, different to the predetermined movement type. Therefore, the classification algorithm may be initially trained to detect a first movement type, and may be retrained, based on user-specific data, to detect a second, different movement type. As such, the classification algorithm can be tailored to the behaviour of a specific user, e.g. to detect the specific movement type(s) used by the user.

In embodiments, the classification data is stored in the memory 260. This allows the data to be used at a subsequent time, e.g. for post-treatment analysis and/or generating a behaviour profile of the use of the device 100 for the user. In embodiments, the classification data is outputted for transmission to a remote device, e.g. a user device.

In embodiments, training data is received from a remote device. In such embodiments, the classification algorithm is modified using the received training data. The training data may be received from a network, e.g. 'the Cloud'. Such training data may comprise IMU data and/or classification data associated with other users. Such training data may comprise crowd-sourced data, for example. In embodiments, such training data is greater in volume than IMU data and/or classification data obtained using the oral treatment device 100 directly. The use of the training data from the remote device to modify the classification algorithm can increase the accuracy and/or reliability of the classification algorithm compared to a case in which such training data is not used.

In embodiments, the classification algorithm comprises a non-linear classification algorithm. A non-linear classification algorithm can be used to distinguish between behaviours that are not linearly separable. This may be the case for a user moving the device during use. Therefore, using a non-linear classification algorithm to obtain the classification data results in a more accurate and/or reliable determination of the classification data compared to using a linear classification algorithm or function.

In embodiments, the classification algorithm comprises a machine learning algorithm. Such a machine learning algorithm may improve (e.g. increase accuracy and/or reliability of classification) through experience and/or training. In embodiments, the classification algorithm is trained using supervised and/or unsupervised machine learning methods to detect whether the device 100 is being moved according to the predetermined movement type.

In embodiments, the oral treatment device 100 comprises a machine learning agent, the machine learning agent comprising the classification algorithm. As such, the classification algorithm may be located on the oral treatment device 100. Performing the determining of the movement type on the device 100 reduces latency compared to a case in which the classification algorithm is not located on the device 100, since data is not required to be transmitted to and/or received from another device. This enables the movement type to be distinguished more quickly, thereby reducing the time taken for any corrective action to be taken, and/or for an output to be provided via a user interface.

It is to be understood that any feature described in relation to any one embodiment and/or aspect may be used alone, or in combination with other features described, and may also be used in combination with one or more features of any other of the embodiments and/or aspects, or any combination of any other of the embodiments and/or aspects. For example, it will be appreciated that features and/or steps described in relation to a given one of the methods 300, 400, 500, 600, 700, 800, 900, 1000 may be included instead of or in addition to features and/or steps described in relation to other ones of the methods 300, 400, 500, 600, 700, 800, 900, 1000.

In embodiments of the present disclosure, the automatic operation of the device 100 (e.g. in relation to any of the methods 300, 400, 500, 600, 700, 800, 1000) can be overridden by the user of the device 100. For example, the user may desire that a repeated treatment (e.g. a further jet of working fluid) be delivered to an already-treated interproximal gap, where the automatic operation implemented by the controller 210 is preventing such repeated treatment. This may occur, for example, if the initial treatment of the gap was unsuccessful and/or unsatisfactory for the user. In embodiments, the device 100 comprises a user interface, e.g. a button, to enable the user to force a repeated treatment, thereby overriding the automatic operation of the device 100.

In embodiments of the present disclosure, one or more data analysis algorithms are used to control the oral treatment device 100, e.g. to detect interproximal gaps, to determine an intra-oral location of the head of the device 100, to determine whether the device 100 is being moved according to a predetermined movement type, etc. The data analysis algorithm(s) is configured to analyse received data, e.g. image data and/or IMU data, and produce an output useable as a condition by which the device 100 is controlled, e.g. gap or no gap. In embodiments, the data analysis algorithm(s) comprises a classification algorithm, e.g. a non-linear classification algorithm. In embodiments, the data analysis algorithm(s) comprises a trained classification algorithm, e.g. as described above with reference to FIGS. 3 to 10. However, in alternative embodiments, the data analysis algorithm(s) comprises other types of algorithm, e.g. not necessarily trained and/or not configured to perform classification.

In embodiments of the present disclosure, the oral treatment device 100 comprises a controller 210. The controller 210 is configured to perform various methods described herein. In embodiments, the controller 210 comprises a processing system. Such a processing system may comprise one or more processors and/or memory. Each device, component, or function as described in relation to any of the examples described herein, for example the image sensor equipment 230, user interface 250, and/or machine learning agent, may similarly comprise a processor or may be comprised in apparatus comprising a processor. One or more aspects of the embodiments described herein comprise processes performed by apparatus. In some examples, the apparatus comprises one or more processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above-described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

The one or more processors of processing systems may comprise a central processing unit (CPU). The one or more processors may comprise a graphics processing unit (GPU). The one or more processors may comprise one or more of a field programmable gate array (FPGA), a programmable logic device (PLD), or a complex programmable logic device (CPLD). The one or more processors may comprise an application specific integrated circuit (ASIC). It will be appreciated by the skilled person that many other types of device, in addition to the examples provided, may be used to provide the one or more processors. The one or more processors may comprise multiple co-located processors or multiple disparately located processors. Operations performed by the one or more processors may be carried out by one or more of hardware, firmware, and software. It will be appreciated that processing systems may comprise more, fewer and/or different components from those described.

The techniques described herein may be implemented in software or hardware, or may be implemented using a combination of software and hardware. They may include configuring an apparatus to carry out and/or support any or all of techniques described herein. Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program. The carrier may comprise a computer readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the present disclosure that are described as preferable, advantageous, convenient or the like are optional and do not limit the scope of the independent claims. Moreover, it is to be understood that such optional integers or features, whilst of possible benefit in some embodiments of the present disclosure, may not be desirable, and may therefore be absent, in other embodiments.

The invention claimed is:

1. An oral treatment device for use in treating an oral cavity of a user, the oral treatment device comprising:
    image sensor equipment configured to generate image data indicative of a sequence of images representing at least a portion of the oral cavity of the user; and
    a controller configured to:
    process the image data to determine a movement parameter indicative of movement of the oral treatment device relative to an interproximal gap between adjacent teeth in the oral cavity of the user, the determined movement parameter being indicative of a predicted future time at which the interproximal gap has a predetermined position relative to the oral treatment device; and
    control the oral treatment device to perform an action based on the determined movement parameter.

2. The oral treatment device according to claim 1, wherein the predicted future time is based on a velocity and/or acceleration of the oral treatment device.

3. The oral treatment device according to claim 1, wherein the controller is configured to process the image data using an optical flow method.

4. The oral treatment device according to claim 1, wherein the controller is configured to control the oral treatment device to deliver a treatment to the interproximal gap at the predicted future time.

5. The oral treatment device according to claim 1, wherein the controller is configured to prevent treatment delivery by the oral treatment device before the predicted future time.

6. The oral treatment device according to claim 1, wherein the oral treatment device comprises a fluid delivery system for delivering working fluid to the oral cavity of the user, and wherein the controller is configured to output a control signal to the fluid delivery system to control delivery of the working fluid based on the determined movement parameter.

7. The oral treatment device according to claim 1, wherein the oral treatment device comprises a head, and wherein the image sensor equipment is at least partially comprised in the head.

8. The oral treatment device according to claim 1, wherein the oral treatment device comprises a handle, and wherein the image sensor equipment is at least partially comprised in the handle.

9. The oral treatment device according to claim 1, wherein the image sensor equipment comprises an intraoral camera.

10. The oral treatment device according to claim 1, wherein the controller is configured to process the image data to detect the interproximal gap.

11. The oral treatment device according to claim 1, wherein the interproximal gap is not present in at least one of the sequence of images, and wherein the controller is configured to estimate a location of the interproximal gap for the at least one of the sequence of images based on a location of the interproximal gap in at least one other image of the sequence of images.

12. The oral treatment device according to claim 1,
    wherein the oral treatment device comprises an inertial measurement unit, IMU, configured to output a signal indicating position and/or movement of the oral treatment device relative to the oral cavity of the user, and
    wherein the controller is configured to determine the movement parameter in dependence on the signal output by the IMU.

13. The oral treatment device according to claim 1, wherein the sequence of images comprises a sequence of time-ordered images.

14. The oral treatment device according to claim 1, wherein the oral treatment device comprises a toothbrush.

15. The oral treatment device according to claim 1, wherein the predetermined position is a position in the path of a jet of working fluid from a fluid delivery system of the oral treatment device.

16. The oral treatment device according to claim 15, wherein the action is delivery or delay of the jet of working fluid.

17. A method of operating an oral treatment device for use in treating an oral cavity of a user, the oral treatment device comprising image sensor equipment and a controller, the method comprising:
    generating, using the image sensor equipment, image data indicative of a sequence of images representing at least a portion of the oral cavity of the user;
    processing, at the controller, the image data to determine a movement parameter indicative of movement of the oral treatment device relative to an interproximal gap between adjacent teeth in the oral cavity of the user, the determined movement parameter being indicative of a predicted future time at which the interproximal gap has a predetermined position relative to the oral treatment device; and
    controlling, at the controller, the oral treatment device to perform an action based on the determined movement parameter.

18. The method according to claim 17, wherein the oral treatment device is controlled, at the controller, to perform the action at the predicted future time to deliver treatment to the interproximal gap.

19. A non-transitory computer-readable medium comprising computer-executable instructions which, when executed by a computerised device, cause the computerised device to perform a method of operating an oral treatment device for use in treating an oral cavity of a user, the method comprising:

generating, using image sensor equipment, image data indicative of a sequence of images representing at least a portion of the oral cavity of the user;

processing the image data to determine a movement parameter indicative of movement of the oral treatment device relative to an interproximal gap between adjacent teeth in the oral cavity of the user, the determined movement parameter being indicative of a predicted future time at which the interproximal gap has a predetermined position relative to the oral treatment device; and controlling the oral treatment device to perform an action based on the determined movement parameter.

20. The non-transitory computer-readable medium according to claim 19, wherein the oral treatment device is controlled to perform the action at the predicted future time to deliver treatment to the interproximal gap.

* * * * *